(12) United States Patent
Mito

(10) Patent No.: US 6,430,634 B1
(45) Date of Patent: Aug. 6, 2002

(54) BUS CONTROLLER AND BUS CONTROL SYSTEM

(75) Inventor: Junichi Mito, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/367,050

(22) PCT Filed: Feb. 7, 1997

(86) PCT No.: PCT/JP97/00325

§ 371 (c)(1),
(2), (4) Date: Aug. 6, 1999

(87) PCT Pub. No.: WO98/35296

PCT Pub. Date: Aug. 13, 1998

(51) Int. Cl.[7] ............................ G06F 13/00; G06F 13/38
(52) U.S. Cl. .................... 710/100; 710/305; 710/313; 710/316
(58) Field of Search ................................. 710/100, 305, 710/313, 316, 1, 4, 106

(56) References Cited

U.S. PATENT DOCUMENTS

| | | | | |
|---|---|---|---|---|
| 5,619,728 A | * | 4/1997 | Jones et al. | 710/27 |
| 5,647,057 A | * | 7/1997 | Roden et al. | 712/200 |
| 5,685,010 A | * | 11/1997 | Yoda | 712/38 |
| 5,819,053 A | * | 10/1998 | Goodrum et al. | 710/100 |

FOREIGN PATENT DOCUMENTS

| | | |
|---|---|---|
| JP | A-02-264351 | 10/1990 |
| JP | A-05-108119 | 4/1993 |
| JP | A-05-134975 | 6/1993 |
| JP | A-07-44506 | 2/1995 |

* cited by examiner

Primary Examiner—Peter Wong
Assistant Examiner—Tim Vo
(74) Attorney, Agent, or Firm—Sughrue Mion, PLLC

(57) ABSTRACT

There is disclosed a bus control device which reduces the data traffic amount of a parallel bus to enhance the performance of the bus control device. A local CPU (111) controls a serial bus transmission/reception controller (113) to give a transmission timing to a transmission interface (120). The bus transmission/reception controller (113) transmits to a serial bus a transmission frame formed by reading predetermined transmission data from a memory (112) storing addresses of a plurality of units (4) connected to the serial bus (51) and transmission/reception data to be transferred to the plurality of units. As a result, transmission/reception is performed with units connected to the serial bus (51) out of the plurality of units via the serial bus, the destination address and transmission data are read from the memory during transmission, and reception data is written to the memory during reception.

15 Claims, 25 Drawing Sheets

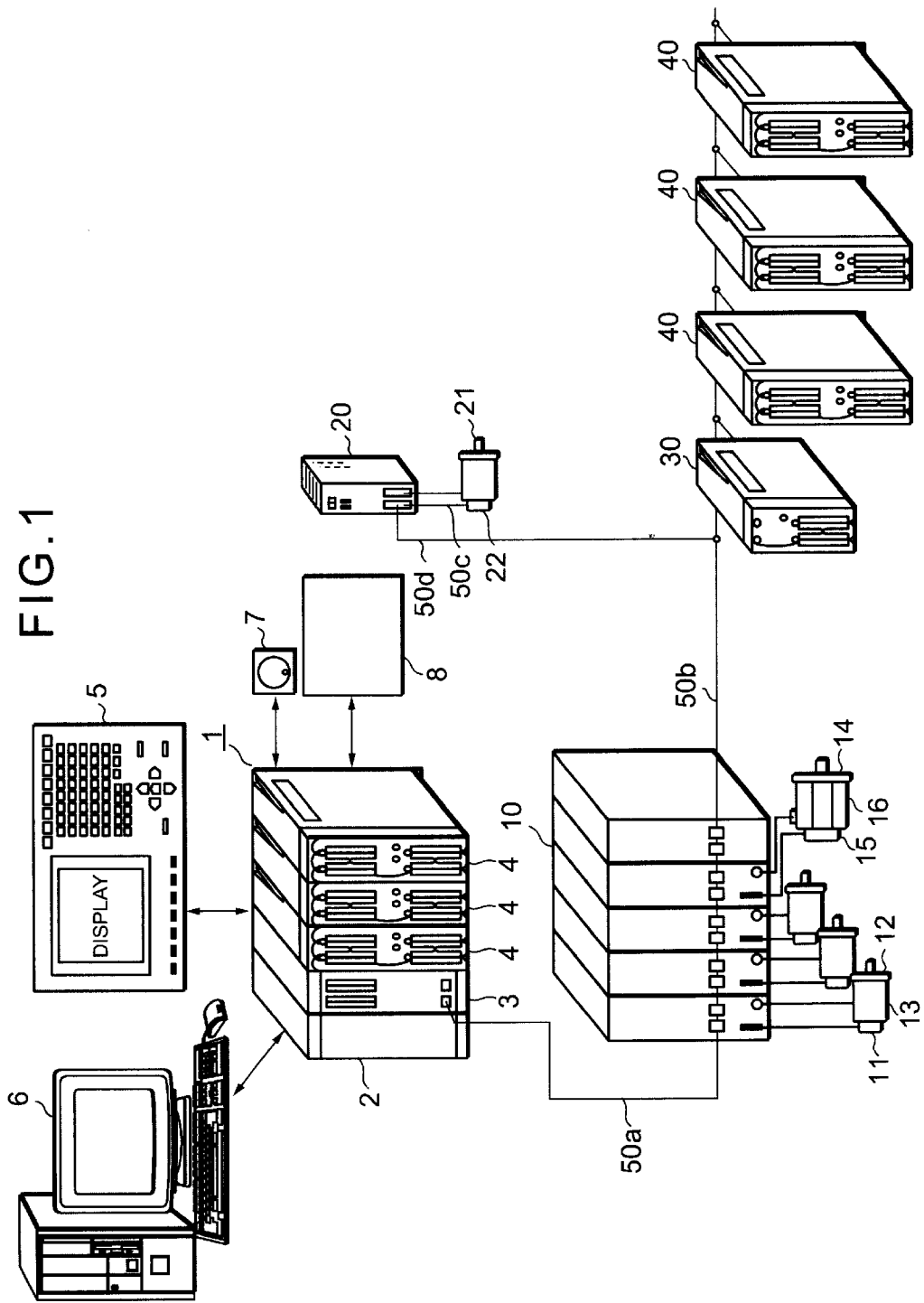

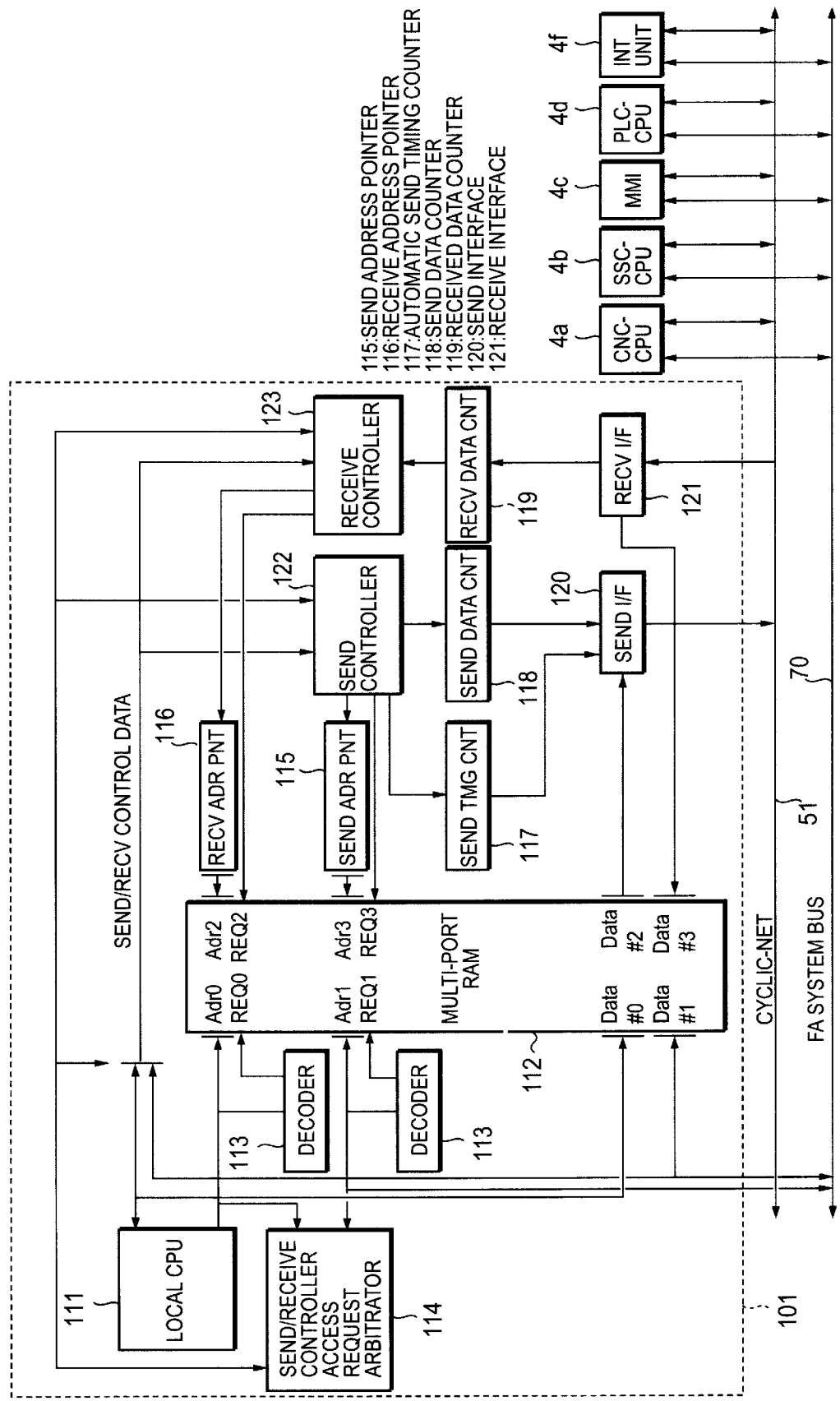

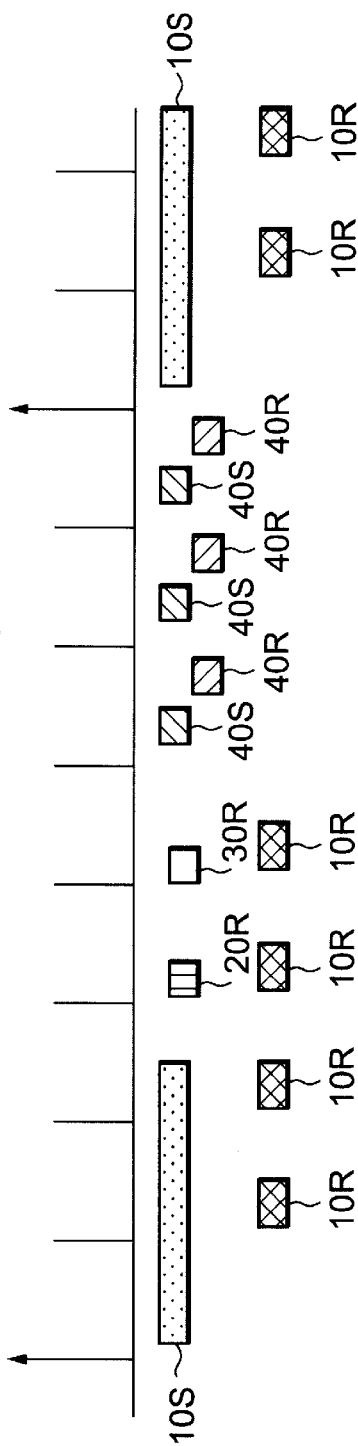
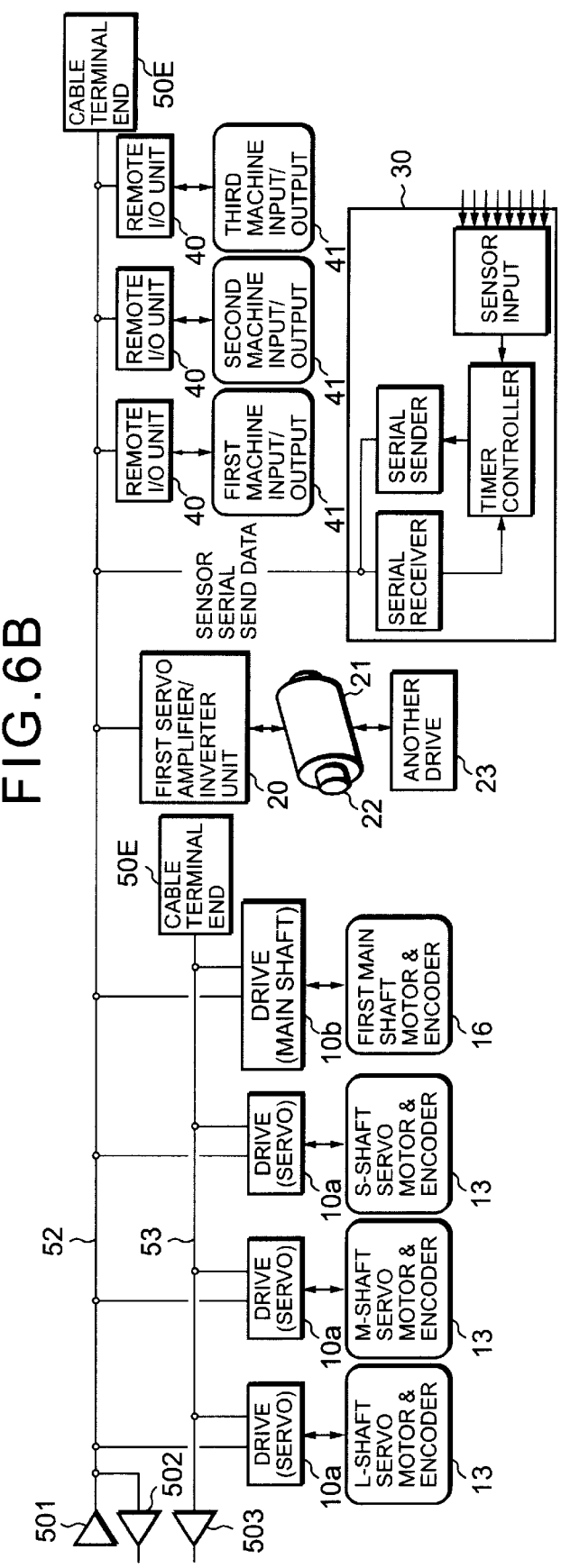
FIG.6A
FIG.6B

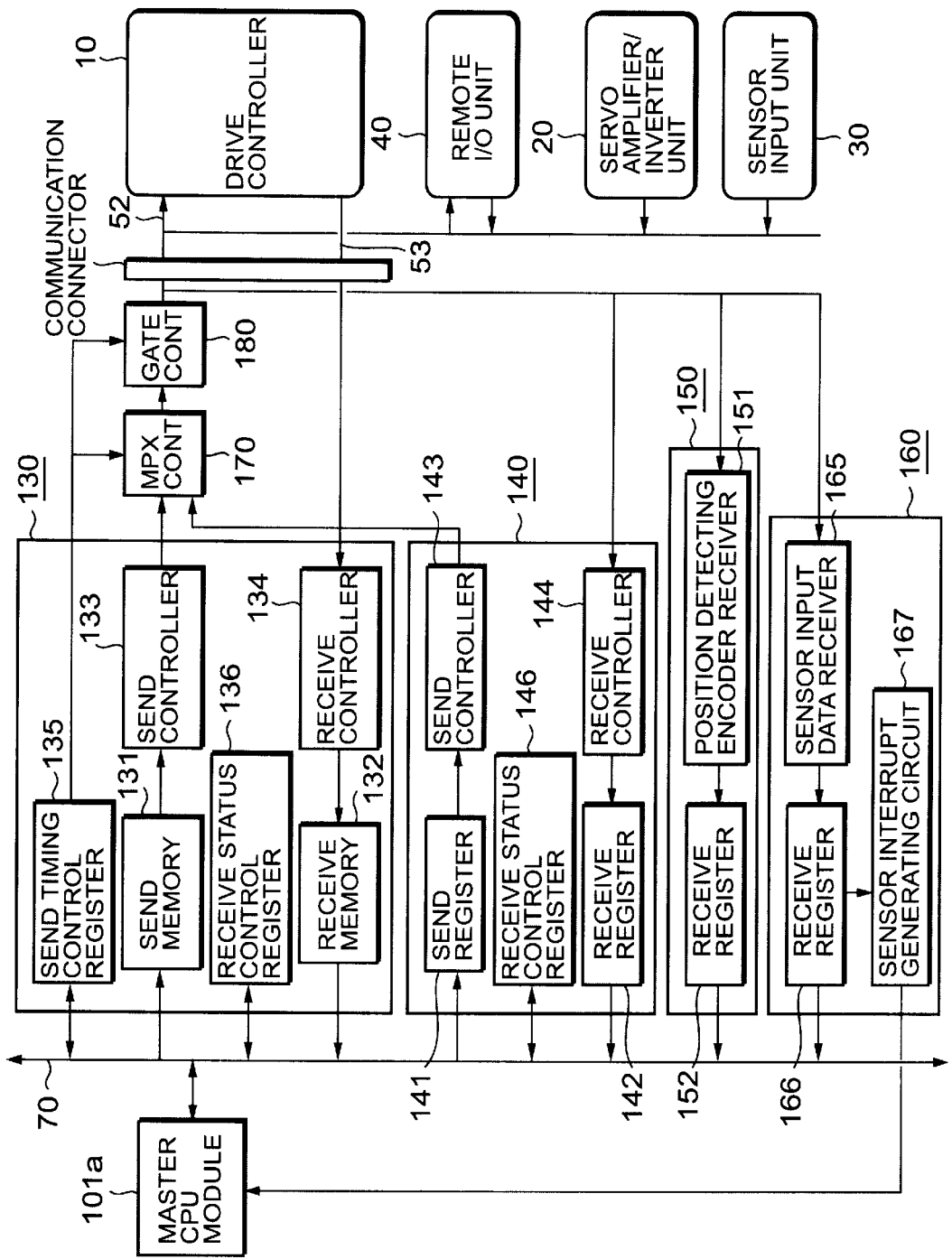

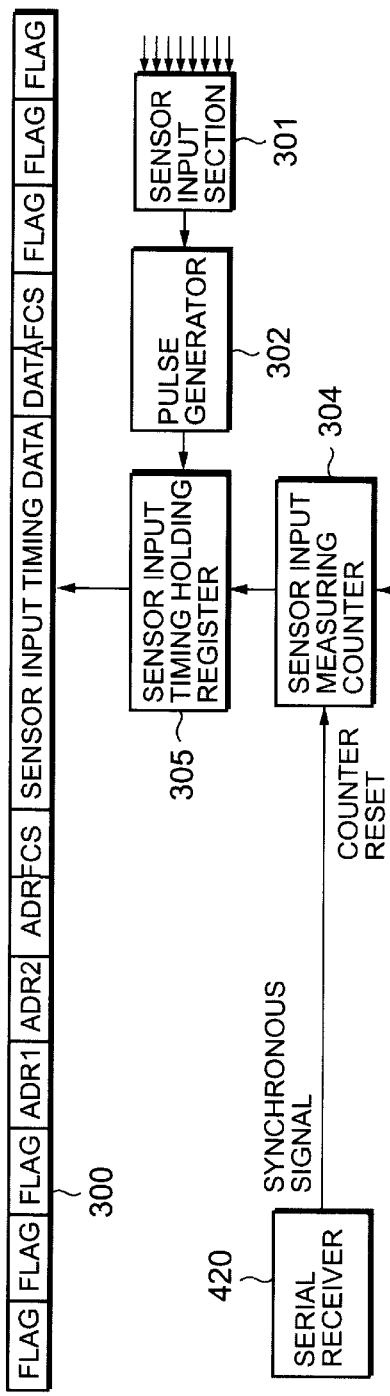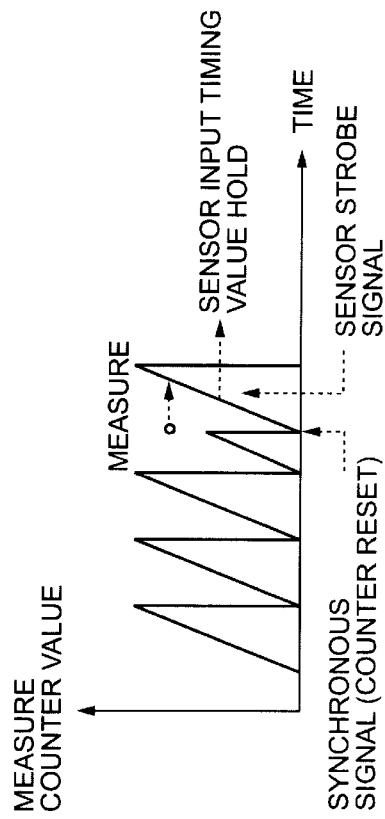
FIG. 9A
FIG. 9B

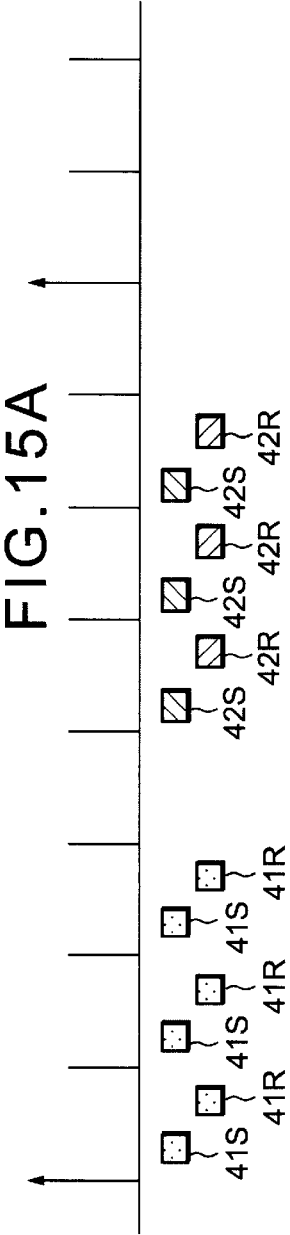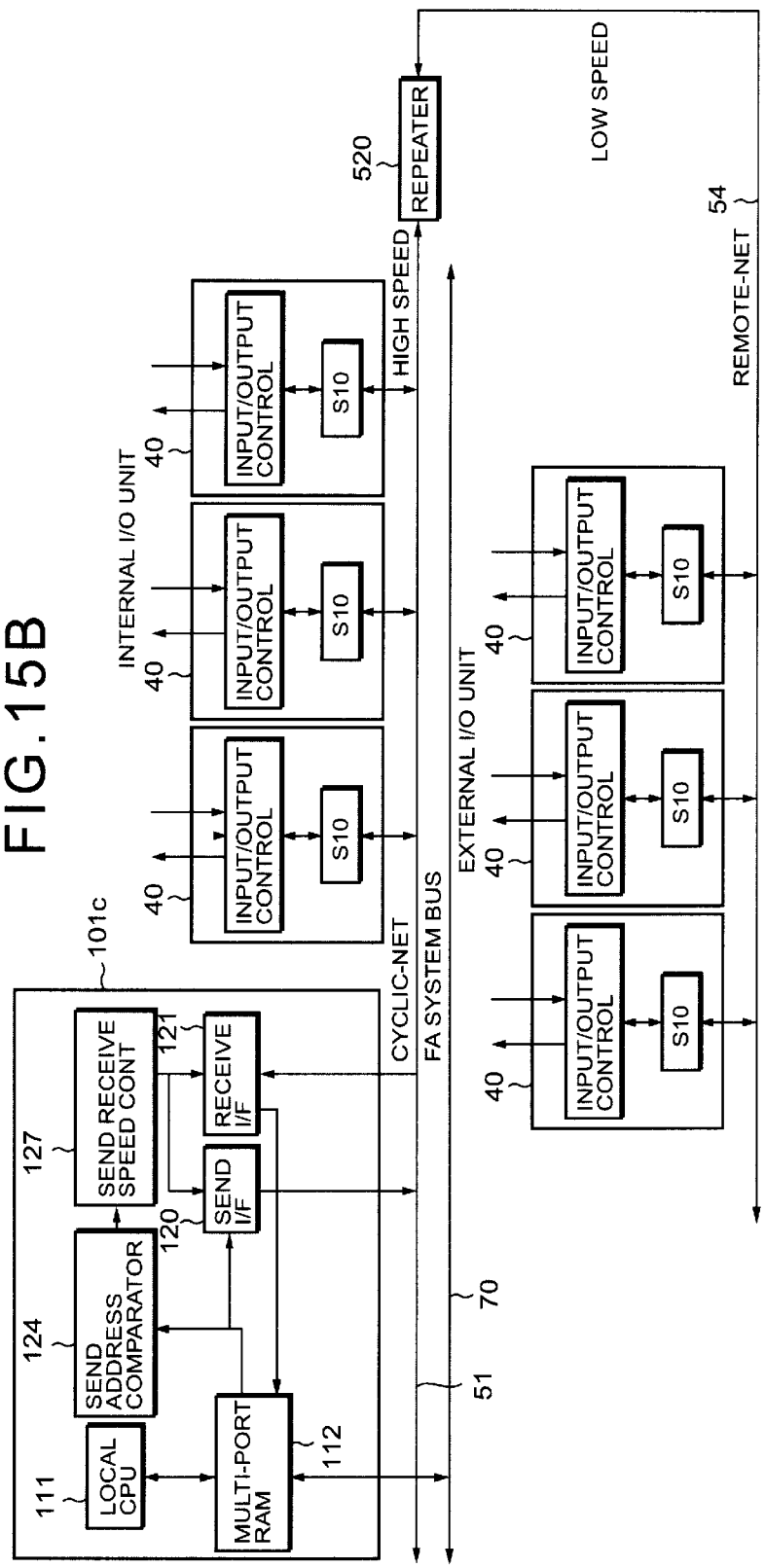

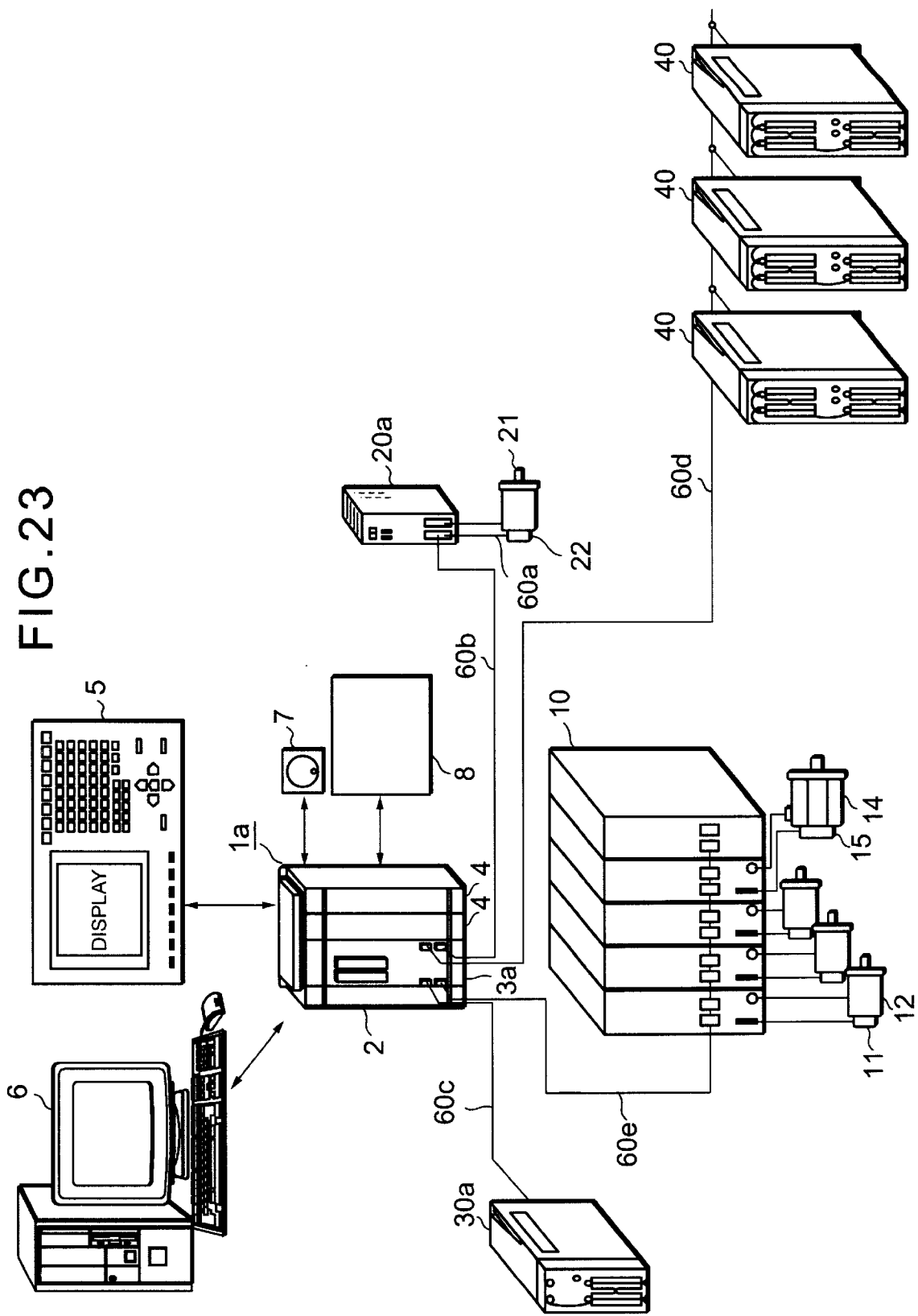

BUS CONTROLLER AND BUS CONTROL SYSTEM

TECHNICAL FIELD

The present invention relates to a bus control device and bus control system, particularly to a bus control device in which cyclic data transfer is performed with units in the bus control device via a serial bus to reduce the traffic amount of a parallel bus and a bus control system in which data transfer is performed with units outside the bus control device by a serial bus.

BACKGROUND ART

FIG. 23 is a schematic diagram showing a connection of a control board in a conventional bus control device and external units. In the drawing, numeral $1a$ denotes an Numeral Control (NC) device unit, 2 denotes an NC device power supply, $3a$ denotes an NC control board, 4 denotes an internal I/O unit of the NC device unit $1a$, 5 denotes an operation panel, 6 denotes a personal computer, 7 denotes a manual handle for manually operating a machine, 8 denotes a mechanical operation panel, 10 denotes a servo amplifier/main shaft amplifier unit (hereinafter referred to as the drive controller), 11 denotes a servo motor encoder, 12 denotes a servo motor, 14 denotes a main shaft motor, 15 denotes a main shaft motor encoder, $20a$ denotes another servo amplifier/inverter for performing positioning and the like, 21 denotes a motor controlled by the servo amplifier/inverter $20a$, 22 denotes a position detecting encoder as a position detector of the motor 21, $30a$ denotes a sensor input unit, 40 denotes a remote I/O unit installed separately from the NC device unit $1a$ to perform I/O control, $60a$ denotes a serial cable for connecting the servo amplifier/inverter $20a$ and position detecting encoder 22 via serial signals, $60b$ denotes a serial cable for serially transmitting position data detected by the position detecting encoder 22 to the NC device unit $1a$, $60c$ denotes a serial cable for connecting the NC device unit $1a$ and sensor input unit $30a$, $60d$ denotes a serial cable for connecting the NC device unit $1a$ and remote I/O units 40 via serial communication, and $60e$ denotes a serial cable for connecting the NC device unit $1a$ and drive controller 10 via serial communication. In the conventional bus control device shown in FIG. 23, the NC control board $3a$, drive controller 10, remote I/O units 40, sensor input unit $30a$, and position detecting encoder 22 are connected to the bus control device via individual cables. Since a large number of cables need to be connected, a large connector mounting space is required. Thus, it is difficult to miniaturize the bus control device.

FIG. 24 shows the bus constitution of the conventional bus control device. FIG. 24(A) is a package view of the conventional bus control device. And FIG. 24B is an explanatory view of the bus control system in which communication is performed between the bus control device and the remote I/O units 40. In the NC device unit $1a$ shown in FIG. 24(a), the NC control board $3a$ is connected to the internal I/O units 4 via a parallel bus 70, and connected to the remote I/O units 40 via the serial cable $60d$. The parallel bus 70 of the conventional bus control device is of a system for handshaking the parallel data. It is composed of a parallel address bus, a data bus, and a plurality of control signal conductors. Specifically, in the bus control device, the internal I/O units 4 for I/O controlling proximate control objects or machines and the NC control board $3a$ are connected via the parallel bus 70. The I/O control is executed on remote control objects or machines via the remote I/O units 40 connected to the serial cable.

The operation of the bus control system will be described next. It is known that in a general parallel bus control system, specified data are read/written from/to memories and registers provided with specified addresses based on a plurality of address signals, data signals, and control signals. The description of those signals is omitted. The bus control device itself performs a cyclic I/O control in accordance with the characteristics of the control objects. In this case, the internal CPU of the NC control board $3a$ performs cyclic data transmission/reception with the internal I/O units 4 and remote I/O units 40 via the parallel bus 70. Therefore, when the parallel bus 70 is used by the main controller of the NC control board $3a$ and the internal I/O units 4 to transfer data, the number of signal wires for the internal I/O units 4 is increased. As a result, it becomes more difficult to miniaturize the bus control device. Additionally, since a plurality of signal conductors is to be controlled, the cost of the internal I/O units 4 is increased. A further problem arises when not all the signal conductors are normal, operational defects are caused, and reliability is impaired.

FIG. 25 is a block diagram showing interfaces between a master CPU module $101e$ in the NC control board $3a$ and various I/O units. In FIG. 25, numeral $130a$ denotes a drive controller interface on the side of the NC device unit $1a$ for controlling communication between a master CPU module $101e$ and a drive controller 10, 131 denotes a sending memory for holding data to be transmitted to the drive controller 10, 132 denotes a receiving memory for holding data received from the drive controller 10, 133 denotes a send controller for performing transmission to the drive controller 10, 134 denotes a receive controller for receiving data from the drive controller 10, 135 denotes a send timing control register for controlling a transmission timing for the drive controller 10, 136 denotes a receive status control register for holding a reception result status from the drive controller 10, $140a$ denotes a remote I/O interface on the side of the NC device unit $1a$ for performing communication with the master CPU module $101e$ and remote I/O unit 40 in the same manner as the drive controller interface $130a$, 141 denotes a sending register for holding data to be transmitted to the remote I/O unit 40, 142 denotes a receiving register for holding data received from the remote I/O unit 40, 143 denotes a send controller for performing transmission to the remote I/O unit 40, 144 denotes a receive controller for receiving data from the remote I/O unit 40, 145 denotes a send timing control register for controlling transmission timings to the remote I/O unit 40, 146 denotes a receive status controller for holding a reception result status from the remote I/O unit 40, $150a$ denotes a position detecting encoder interface on the side of the NC device unit $1a$ for receiving position detection data outputted by the position detecting encoder 22 via the servo amplifier/inverter unit 20, 151 denotes a position detecting encoder receiver for receiving a serial transmission frame including position information from the position detecting encoder, 152 denotes a receiving register for holding data received by the position detecting encoder receiver 151, $160a$ denotes a sensor input interface for receiving sensor input information from the external sensor input unit $30a$, 161 denotes a pulse differentiating circuit for differentiating signals from the sensor input unit 30, 162 denotes a sensor measuring counter for measuring sensor input timings, 163 denotes a counter holding register for holding counter contents or values of the sensor measuring counter 162 based on the signals from the pulse differentiating circuit 161, and 164 denotes a sensor interrupt controller for generating interrupt for the master CPU module $101e$ by sensor inputs. The master CPU module 101e controls the interfaces 130a, 140a, 150a, 160a, while the parallel bus 70 connects the master CPU module 101e with the interfaces 130a, 140a, 150a, 160a.

The operation of the remote I/O interface 140a is described next. When the master CPU module 101e places the data to be outputted to the remote I/O unit 40 in the sending register 141, the send controller 143 automatically follows the timing sequence stored in the send timing control register 145 for data transmission. The send controller 143, following the timing sequence using its internal timer, reads the content of the sending register 141, encapsulates the content in a transmission frame, and transmits the frame to the remote I/O unit 40. When the transmission frame is received by the remote I/O unit 40, and the reception is normally completed, the remote I/O unit 40 transmits output signals to the outside based on the received data. When reception of the reception frame from the master CPU module 101e is normally completed, and after the internal timer of the remote I/O unit 40 indicates that a time for transmitting some bytes at a transmission rate has elapsed, the communication controller on the side of the remote I/O unit 40 assembles the data based on input signals on the remote I/O unit 40 into a transmission frame for transmission to the NC device unit 1a. The frame is transmitted to the receive controller 144 on the side of the control device, and written in the receiving register 142. When the master CPU module 101e reads the frame from the receiving register 142, it recognizes the frame as the input from the remote I/O unit 40.

The data transmitting/receiving operation between the drive controller interface 130a and the drive controller 10 is described next. In the NC device 1a, a program for processing an object is inputted beforehand in the NC control board 3a. The master CPU module 101e decodes the program and prepares an operation command. The operation command is transmitted to the drive controller 10. In response to the instruction from the master CPU module 101e and the timing sequence in the send timing control register 135a, the send controller 133 reads the operation command data from the sending memory 131, assembles a transmission frame, and transmits the frame. The drive controller 10 operates the servo motor 12 and the main shaft motor 14 based on the operation command from the master CPU module 101e. Additionally, the drive controller 10 returns motor position detection information and status information indicating a state of drive controller 10 and the like to the master CPU module 101e. The motor position detection information, status information indicating the state of drive controller 10, and another data transmitted from the drive controller 10 are stored in the receiving memory 132 via the receive controller 134. The data read by the master CPU module 101e is recognized as input from the drive controller 10. Here the description of operation of the position detecting encoder interface 150a and sensor input interface 160a is omitted, but by repeating the above-mentioned procedure, the NC device can process even a complicated configuration in accordance with the program. In the bus control device of the conventional NC device, the transfer of all data inside the NC device unit 1a depends solely on the parallel bus 70. Since the number of wires inside the NC device unit 1a is increased, miniaturization is difficult. Additionally, there is a problem that a high bus traffic performance is necessary.

The prior art solution to the high bus traffic problem is disclosed in Japanese Patent Application Laid-open No. 264351/1990. In that solution, there are provided a serial bus as an internal bus, and serial and parallel buses as backplane buses, so that the bus is selected in accordance with the characteristics of a function module to reduce the data traffic amount of the parallel bus. However, the publication discloses the control content of the serial and parallel buses, but does not disclose that the serial bus is applied in various manners in accordance with installation conditions and characteristics of each unit.

Therefore, the present invention provides a bus control device and bus control system to solve the following conventional problems.

Problem 1: When data transfer to the I/O unit requires cyclic data transfers inside and outside the bus control device and the parallel bus inside the bus control device is occupied, an obstruction to enhancement of performance of the bus control device results. An object of the present invention is to provide a bus control device in which internal and external I/O units connected to the bus control device and requiring cyclic data transfers are provided with a serial bus to reduce the data traffic amount of a parallel bus and to enhance the performance of the bus control system.

Problem 2: Since cyclic data transfer is necessary for the interface of the I/O unit provided on the bus control device itself, and processing is performed by interrupting the data transfer to the other I/O units, abilities of CPU and control bus of the bus control device are deteriorated with frequent interrupts. An object of the present invention is to provide a bus control device comprising a first serial bus for performing cyclic data communication and a second serial bus for performing asynchronous data communication, in which when the cyclic data communication is necessary, processing can be performed by the first serial bus without interrupting the transmission/reception of the second serial bus.

Problem 3: Generally, the external I/O unit connected to the bus control device and requiring serial data communication need to be installed apart from the bus control device. When a distance is lengthened, communication rate is lowered as a result. Since there is a communication rate difference between the serial communication type I/O interface for the internal I/O unit connected to the inside of the bus control device and the external I/O unit, the communication rate for the internal I/O unit has to be lowered. An object of the present invention is to provide a bus control system in which after analyzing header information including a destination address to switch a transmission rate, transmission from an I/O unit is waited for with a reception clock corresponding to the same transmission rate, and transmission/reception can be performed with I/O units corresponding to different transmission rates.

Problem 4: There are a plurality of external I/O units connected to the bus control device and requiring serial data communication. The large number of signal conductors enlarges the connector space, complicates the cable wiring, and prevents the miniaturization of the bus control device. An object of the present invention is to provide a bus control system in which a bus control device is provided with an inventive interface to share a communication line of a drive controller with another external I/O unit, so that a connecting connector space is reduced and a cable wiring is simplified.

SUMMARY OF THE INVENTION

In a bus control device of the present invention, a local CPU controls a serial bus transmission/reception controller for sending a transmission timing to a transmission interface for reading a predetermined transmission data from a memory with destination addresses of a plurality of units connected to a serial bus. The transmission/reception data is transferred with the plurality of units stored in the memory to form a transmission frame. The frame is transmitted to the serial bus in such a manner that transmission/reception is performed with units connected to the serial bus out of the plurality of units via the serial bus. The destination address and transmission data are read from the memory during transmission, and received data is written to the memory during reception. Therefore, the transmission is automatically made to other units in accordance with the preset transmission timing, and the data received from the other units is automatically stored in the memory, so that the received data on the memory can be read in accordance with a control cycle. Moreover, communication can be performed to the unit connected to the bus control device by requiring cyclic data transfer via the serial bus. As a result, the data traffic amount of the parallel bus can be reduced to enhance the performance of the bus control device.

Moreover, in the bus control device of the present invention, the local CPU and CPU provided on the unit read/write data stored in the memory via the transmission or reception interface. As a result, the local CPU and the CPU provided on the unit could read input data received on the memory from the other units in accordance with a single control cycle.

Furthermore, in the bus control device of the present invention, the transmission and reception interfaces connected to a first serial bus perform a cyclic transmission/ reception, while the transmission and reception interfaces connected to a second serial bus perform an asynchronous message transmission/reception. In this case, the second serial bus can be used for a large number of purposes without being interrupted by the cyclic transmission/reception.

Moreover, in the bus control device of the present invention, the transmission interface connected to the second serial bus transmits the transmission frame including header information designating individual units connected to the second serial bus. The transmission frame includes header information for performing broadcast communication to simultaneously notify the units connected to the second serial bus of the message. In this case, a simultaneous broadcast function can be realized by the second serial bus.

Furthermore, in the bus control device of the present invention, when the transmission frame with the header information for performing broadcast communication added thereto is transmitted to the second serial bus, the communication by the first serial bus is cut off. In this case, when the broadcast communication is a notification of abnormality, the communication of the first serial bus is cut off, and the connected unit performs output OFF operation at the time of the abnormality. Therefore, the safety of the system can be enhanced.

Moreover, in the bus control system of the present invention, a transmission address comparator compares destination unit addresses, and outputs a signal indicating whether the transmission frame is to be transmitted to a high-speed serial bus or a low-speed serial bus. A transmission change-over switch selects either the high-speed serial bus or the low-speed serial bus to output the transmission frame in response to the output signal of the transmission address comparator. In this case, the transmission rate inside the bus control device can be set without considering the distance of the low-speed serial bus used to connect the external unit. The result is that the transmission rate to an internal unit connected to the high-speed serial bus does not need to be lowered. Thus, the communication performance for the internal unit of the bus control device can be enhanced.

Furthermore, in the bus control system of the present invention, a serial bus transmission controller performs a rate switching of high-speed transmission and low-speed transmission in accordance with a comparison result of the destination unit addresses. The transmission interface transmits to the high-speed serial bus the transmission frame formed by reading predetermined transmission data from the memory at the transmission rate in response to the rate switching. When the transmission rate of the transmission frame transmitted from the high-speed serial bus is low, a low-speed serial bus controller provided between the high-speed serial bus and the low-speed serial bus transmits the transmission frame to the low-speed serial bus. In this case, since the transmission rate inside the bus control device can be set without considering the influence of the distance of the external unit connected to the low-speed serial bus, the transmission rate of the external/internal unit does not need to be lowered. Furthermore, the communication performance for the unit inside the bus control device can be enhanced.

Additionally, in the bus control system of the present invention, high-speed transmission is performed for a drive controller requiring a machine high-speed, high-precision control, while low-speed transmission can be performed for a remote I/O unit sufficient with a relatively low speed and installed remotely from the bus control device. Therefore, a flexible system can be constructed without lowering the performance of the drive controller requiring the high-speed transmission.

Moreover, in the bus control system of the present invention, when the transmission interface performs a time division transmission for the drive controller and remote I/O unit, the bus control device can perform the control of the drive controller without being interrupted.

Furthermore, in the bus control system of the present invention, the transmission interface of a serial bus control device transmits to the serial bus the transmission frame formed by reading the predetermined transmission data from the memory. The transmission interface further controls the timing for transmission to the other units in a time zone in which no transmission is made to one unit via the serial bus. The reception interface monitors the serial bus, receives a reception frame including the header information of the device, and writes the data in a predetermined address of the memory. In this case, the serial bus can be shared in the communication for the one and other units, and the one and other units do not require individual cables or connectors. Therefore, the bus control device can be miniaturized, and the cable wiring can be simplified.

Additionally, in the bus control system of the present invention, the bus control device performs transmission to the remote I/O unit in a time period during which the mechanical high-speed, high-precision drive controller makes no transmission. Therefore, a flexible system can be constructed without lowering the performance of the drive controller which has to transmit/receive much information.

Moreover, in the bus control system of the present invention, the bus control device receives data from a servo amplifier/inverter unit in a time period during which no transmission requiring mechanical high-speed, high-precision control is made to the drive controller. Thus, a flexible system can be constructed without lowering the performance of the drive controller which has to transmit/ receive much information.

Furthermore, in the bus control system of the present invention, a serial receiver of the servo amplifier/inverter unit outputs a synchronous signal when the transmission frame transmitted to the drive controller by the bus control device is normal. A predetermined time behind the output of the synchronous signal, the servo amplifier/inverter unit transmits position information of another motor to the reception interface. Therefore, the serial bus can be shared without interrupting the communication of the bus control device and the drive controller.

Additionally, in the bus control system of the present invention, the bus control device receives data from a sensor input unit in the time period in which no transmission requiring the machine high-speed, high-precision control is made to the drive controller. As a result, a flexible system can be constructed without lowering the performance of the drive controller which has to transmit much information.

Moreover, in the bus control system of the present invention, a serial receiver of the sensor input unit outputs a synchronous signal when the transmission frame transmitted to the drive controller by the bus control device is normal. Then, a deviation amount between a synchronous signal output timing and a sensor input timing is transmitted to the reception interface. Therefore, the bus control device is able to determine the time when a sensor input is made while a command is repeatedly transmitted to the drive controller.

BRIEF DESCRIPTION OF THE DRAWINGS

FIGS. 1 to 22 show preferred embodiments of a bus control device and a bus control system according to the present invention:

FIG. 1 is a schematic diagram of a bus control system of the present invention;

FIG. 2 is a schematic diagram of a bus control device of the present invention;

FIG. 3 is an explanatory view of the bus control system in which a drive controller and remote I/O units are connected to a common serial bus;

FIG. 4 is an explanatory view of the bus control system in which the drive controller and servo amplifier/inverter units are connected to the common serial bus;

FIG. 5 is an explanatory view of the bus control system in which the drive controller and a sensor input unit are connected to the common serial bus;

FIG. 6 is an explanatory view of the bus control system according to another embodiment of the present invention;

FIG. 7 is a block diagram of an interface for connecting the bus control device of the present invention and each external I/O unit;

FIG. 8 is a schematic diagram of a transmission frame for use in the bus control system of the present invention, servo amplifier/inverter unit connected to the serial bus, and a serial transmitter and serial receiver provided on the sensor input unit;

FIG. 9 is an explanatory view of transmission data to NC device unit from the sensor input unit and transmission timing of the data;

FIG. 10 is an explanatory view of constitution/operation for transmitting the transmission data to the NC device unit from the servo amplifier/inverter unit;

FIG. 11 is a schematic diagram of the NC device unit provided with the bus control device of the present invention;

FIG. 12 is a schematic diagram of the bus control system in which remote I/O units are connected to the NC device unit;

FIG. 13 is an explanatory view of the bus control system for switching REMOTE-NET and CYCLIC-NET to communicate with internal and external remote I/O units;

FIG. 14 is a connection diagram showing a periphery of a transmission change-over switch as a constituting element of FIG. 13;

FIG. 15 is an explanatory view of the bus control system for switching REMOTE-NET and CYCLIC-NET for communication according to another embodiment shown in FIG. 12;

FIG. 16 is a connection diagram showing the periphery of the transmission change-over switch as a constituting element of FIG. 15;

FIG. 17 is an explanatory view of the bus control system in which the drive controller and servo amplifier/inverter unit are connected to the NC device unit via MOTION-NET as a serial bus capable of performing a high-speed, short-distance communication, and other remote I/O units and sensor input unit are connected to the NC device unit via REMOTE-NET capable of performing a low-speed, long-distance communication;

FIG. 18 is a block diagram showing an inner constitution of a repeater;

FIG. 19 is an explanatory view of the bus control device in which the NC device unit is provided a serial bus for performing cyclic transmission/reception of an asynchronously generated message;

FIG. 20 is a schematic diagram showing an outline of BN-Bridge;

FIG. 21 is a schematic diagram showing details of a bridge controller; and

FIG. 22 is a schematic diagram showing BN-Bridge which cuts off CYCLIC-NET transmission and performs simultaneous broadcast communication to notify BACKPLANE-NET of an abnormal state.

Moreover, FIGS. 23 to 25 show a conventional bus control device and bus control system:

FIG. 23 is a schematic diagram showing a connection of a control board in the conventional bus control device and external units;

FIG. 24 is an explanatory view of a bus constitution of the conventional bus control device; and FIG. 25 is a block diagram of interfaces between master CPU module in NC control board and various I/O units.

DETAILED DESCRIPTION OF PREFERRED EMBODIMENT

Basic Constitution of Bus Control System

Figure 3A:
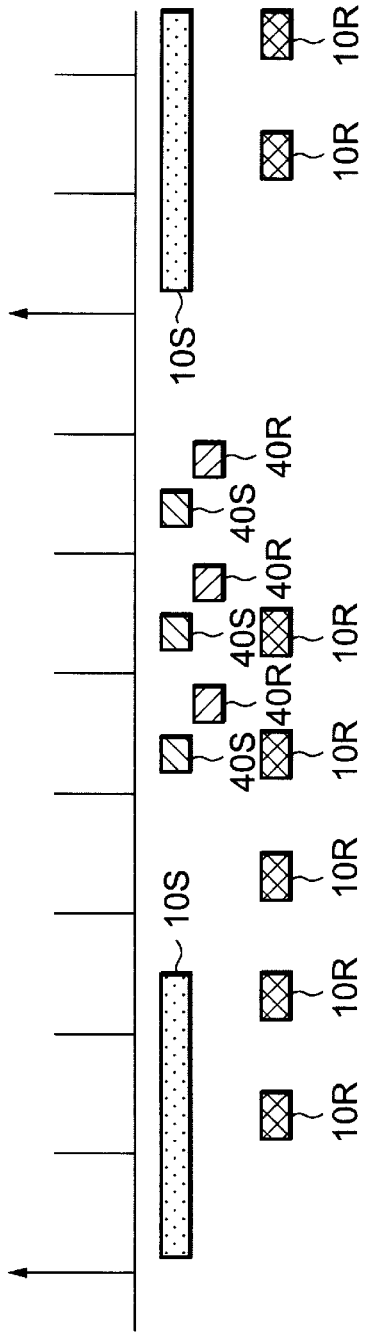

FIG. 1 is a schematic diagram of a bus control system of the present invention. It illustrates the NC device provided with the bus control device of the present invention. In FIG. 1, numeral 1 denotes an NC device unit; 2 denotes an NC device power supply; 3 denotes an NC control board; 4 denotes an internal I/O unit of the NC device unit 1; 5 denotes an operation panel; 6 denotes a personal computer; 7 denotes a manual handle for manually operating a machine; 8 denotes a machine operation panel; 10 denotes a servo amplifier/main shaft amplifier unit; 11 denotes a servo motor encoder; 12 denotes a servo motor; 13 denotes a servo motor unit constituted by combining the servo motor encoder 11 and servo motor 12; 14 denotes a main shaft motor; 15 denotes a main shaft motor encoder; 16 denotes a main shaft motor unit constituted by combining the main shaft motor 14 and servo motor encoder 15; 20 denotes another servo amplifier/inverter unit for performing positioning and the like; 21 denotes a motor controlled by the servo amplifier/inverter unit 20; 22 denotes a position detecting encoder for detecting a position of the motor 21; 30 denotes a sensor input unit; 40 denotes a remote I/O unit installed separately from the NC device unit 1 to perform I/O control with the NC device unit 1; 50a denotes a serial cable for connecting the NC device unit 1 and drive controller 10; and 50b denotes a serial cable extended from the cable 50a characterizing the present invention to connect the position detecting encoder 22 of another servo amplifier/inverter unit 20, sensor input unit 30, and remote I/O units 40. Numeral 50c denotes a serial cable for connecting the servo amplifier/inverter unit 20 and position detecting encoder 22, which is connector-relayed by the servo amplifier/inverter unit 20 and connected to the serial cable 50b via a serial cable 50d. Here, in actual, since the positioning motor 21 is controlled by the servo amplifier/inverter unit 20, the position detection data of the position detection encoder 22 is relayed to the servo amplifier/inverter unit 20 as control feedback, and fed back to the NC device unit 1.

Communication with Internal I/O Units in NC Device Unit

FIG. 2 is a schematic diagram of a bus control device of the present invention, and shows an example provided in NC device. In FIG. 2, numerals 4a to 4f denote examples of internal I/O units in the NC device unit 1: 4a denotes an NC control CPU for performing NC control; 4b denotes a servo control CPU for controlling another servo motor; 4c denotes a man-machine control interface (I/F); 4d denotes a programmed logic control (PLC) CPU for performing a sequence control; and 4f denotes an expansion interface control unit. Numeral 51 denotes a serial bus CYCLIC-NET for cyclic transmission/reception in the bus control device. Numeral 70 denotes a parallel bus factory automation (FA) SYSTEM BUS for performing communication in the bus control device. And numeral 101 denotes a master CPU module provided on the NC control board 3 to control the communication of the bus control device, including the following constitution. Numeral 111 denotes a local CPU for controlling communication of the master CPU module 101; 112 denotes a multi-port RAM; 113 denotes a decoder circuit for decoding a request for access to multi-port RAM from the local CPU 111 and CPU of another I/O unit connected to FA SYSTEM BUS 70; 114 denotes a communication controller access request arbitrator for arbitrating an access to a send controller 122 and a receive controller 123 from the local CPU 111 and the CPU of another I/O unit connected to FA SYSTEM BUS 70; 115 denotes a send address pointer for giving a reading address to the multi-port RAM 112 at the time of transmission to CYCLIC-NET 51; 116 denotes a receive address pointer for giving a writing address to the multi-port RAM 112 at the time of reception from CYCLIC-NET 51; 117 denotes an automatic send timing counter for giving a transmission timing for cyclic transmission to a send I/F 120; 118 denotes a send data number counter for counting the number of transmission data bytes included in a frame to be transmitted to instruct the send interface 120 to complete formation of the transmission frame when the predetermined number of transmission data bytes is reached; 119 denotes a received data number counter for counting bytes received by the receive interface 121; 120 denotes the send interface for transmitting the transmission frame to CYCLIC-NET 51; and 121 denotes the receive interface for receiving a reception frame from the CYCLIC-NET 51. Numeral 122 denotes a send controller, 123 denotes a receive controller. The send controller 122 and the receive controller 123 are sometimes referred to generically as the send/receive controller.

The operation of the master CPU module 101 is described next using FIG. 2. When starting the system, the local CPU 111 or another system CPU connected on FA SYSTEM BUS 70 performs initialization setting of the send controller 122 and receive controller 123 so that hand shaking can be executed.

When a transmission is made by the master CPU module 101 to the CYCLIC-NET 51, the send controller 122 gives a reading address to the multi-port RAM 112 via the send address pointer 115. Then, the automatic send timing counter 117 gives a timing of cyclic transmission to the send interface 120. Subsequently, the send interface 120 reads transmission data from the multi-port RAM 112 to transmit the transmission frame to the CYCLIC-NET 51. Additionally, the send data number counter 118 counts the number of transmission data and instructs the send interface 120 to complete the transmission frame when the predetermined number of data is reached. Moreover, the receive interface 121 monitors the CYCLIC-NET 51 to receive a frame including header information corresponding to its station and write data to a predetermined address of the multi-port RAM 112. Furthermore, the send/receive controller 122 and 123 access request arbitrator 114 receives from the decoder 113 an access request to the send/receive controller from the local CPU 111 or another I/O unit CPU, arbitrates the access request, and controls so as to perform communication via the CYCLIC-NET 51 in response to each request. In addition to providing the CYCLIC-NET 51 to the internal I/O units 4a to 4f connected to the NC device unit 1 which require cyclic data transfer, the externally provided remote I/O unit 40 or the like is also provided with the CYCLIC-NET 51 on control bus. This connection reduces the data traffic amount of FA SYSTEM BUS 70, so that the performance of the NC device unit 1 can be enhanced. A simultaneous broadcast communication function can be realized by CYCLIC-NET 51. When the local CPU 111 stores in the multi-port RAM 112 the data to be sent/received on CYCLIC-NET 51 between the internal/external I/O units of NC device unit 1 and the master CPU module 101, automatic transmission is performed to the internal/external I/O units in accordance with the preset transmission timing. Additionally, response frames from the internal/external I/O units are automatically stored on the multi-port RAM 112 in accordance with the preset address pointer for the multi-port RAM 112. Therefore, the local CPU 111 can read input data received on the multi-port RAM 112 from the internal/external I/O units in accordance with its control cycle.

Here, the multi-port RAM 112 receives access requests from the send controller 122, receive controller 123, local CPU 111 and other I/O units connected to FA SYSTEM BUS to arbitrate the access requests inside, and operates in a time-division manner.

In the above-mentioned constitution, the I/O unit or another unit having less time for data processing but high frequency of data communication does not have to communicate using a parallel bus. The parallel bus can be used in I/O for the purpose of controlling a large amount of data to be processed.

Sharing of Serial Bus by Time Division Communication

Figure 3B:
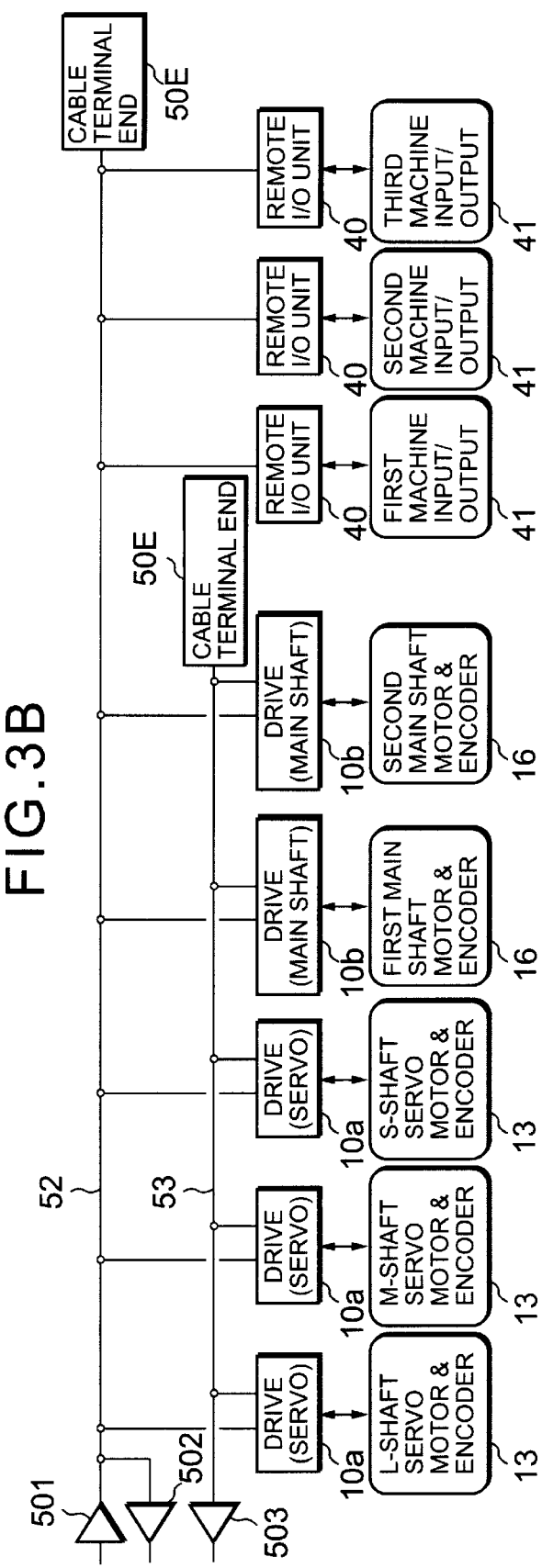

FIG. 3 is an explanatory view of the bus control system of the present invention. It illustrates communication using a common serial bus between the NC device unit 1 and the drive controller 10 and remote I/O units 40. FIG. 3(A) is a timing explanatory view showing time division communication between the NC device unit 1 and the drive controller 10 and remote I/O units 40. FIG. 3(B) is a detailed connection explanatory view of the NC device unit 1 and the drive controller 10 and external remote I/O units 40. In FIG. 3, numeral 101*a* denotes a servo motor drive controller; 10*b* denotes a main shaft motor drive controller; 13 denotes a servo motor unit; 16 denotes a main shaft motor unit; 41 denotes a machine input/output circuit for transmitting/receiving an input/output signal of the remote I/O unit 40; 50E denotes a terminal end circuit of a serial transmission cable; 501 denotes a send driver element on the side of the control device; 502, 503 denote receiver elements; and 52, 53 denote serial buses. Moreover, numeral 10S denotes a servo, main shaft amplifier command data outputted by the NC device unit 1; 40S denotes output data outputted to the external remote I/O unit 40 by the NC device unit 1; 40R denotes input data transmitted to the NC device unit from the external remote I/O unit 40; and 10R denotes servo, main shaft amplifier feedback data. Each data 10R is being constituted in a predetermined frame together with an address indicative of a destination/transmission end prior to being transmitted/received.

The operation of the bus control system will next be described. The NC device unit 1 is provided with an interface described later and shown in FIG. 7 to transmit three types of data via the serial bus 52. The first type of data being transmitted is the servo main shaft amplifier command data 10S. It is being transmitted to the servo motor drive controllers 10*a* and main shaft motor drive controllers 10*b*. The second type of data being transmitted is the output data 40S. The output data 40S is sent between the NC device unit 1 and the remote I/O units 40. The third type of data being transmitted is the received input data 40R. While no operation command data 10S is transmitted to the servo motor drive controllers 10*a* or the main shaft motor drive controllers 10*b*, the NC device unit 1 transmits the output data 40S to the remote I/O units 40, and thereafter receives return frames including the input data 40R from the remote I/O units 40. Moreover, the servo, main shaft amplifier feedback data 10R from the servo motor drive controllers 10*a* and main shaft motor drive controllers 10*b* are transmitted via the serial bus 53.

Figure 25:
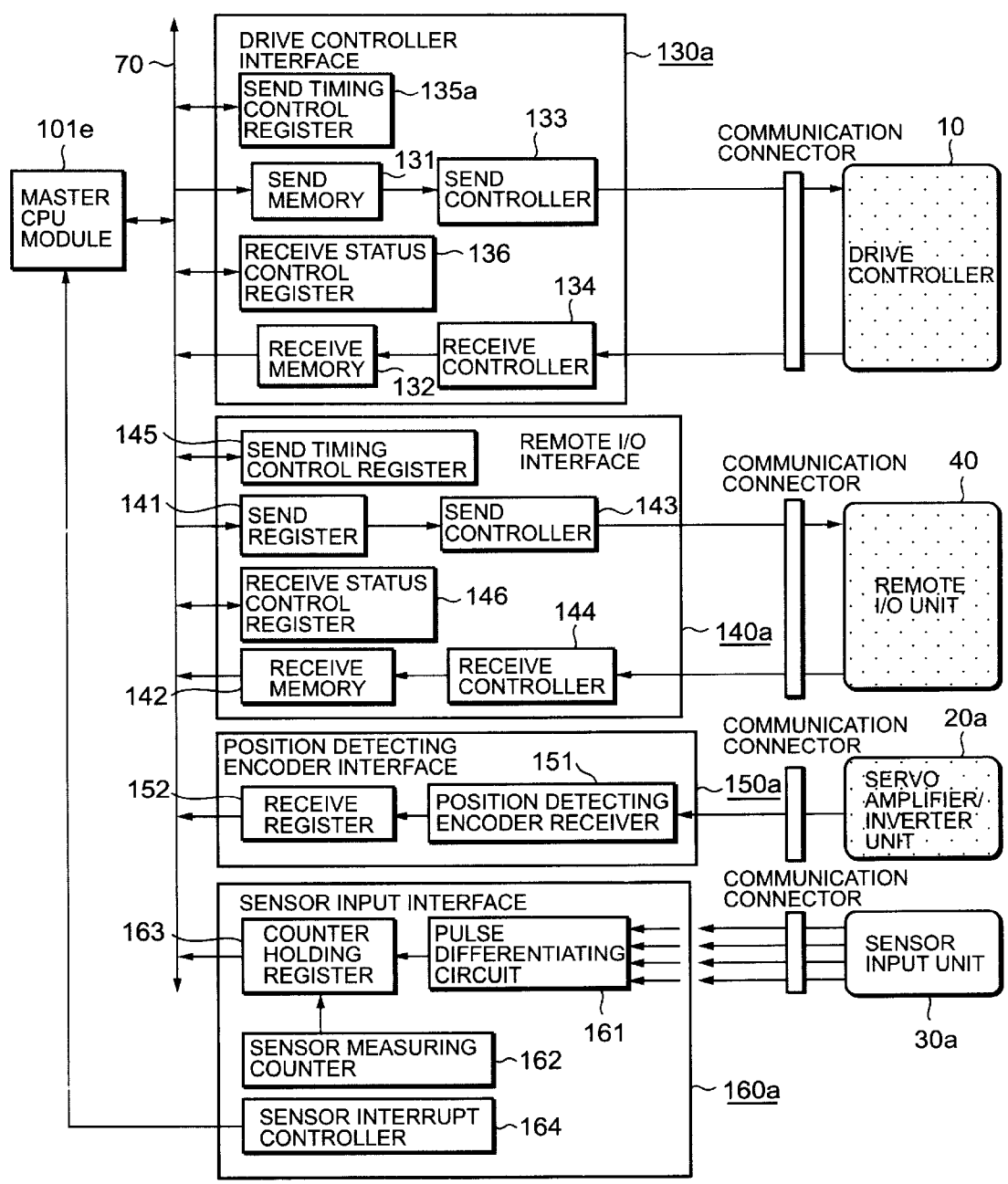

As shown in FIGS. 23 and 25, the conventional NC device unit 1*a* and the drive controller 10, and the NC device 1*a* and the remote I/O unit 40 are connected via different serial buses. Specifically, since the data transmission requirement with the drive controller 10*a* is high, and the status information from the ordinary drive controller 10 needs to be monitored on the side of NC device unit 1*a*, a full duplex communication system is used. On the other hand, in the communication for the remote I/O units 40, because wiring is to be facilitated and long-distance transmission is necessary, a half duplex communication system is used since the communication rate is lower than that for the drive controller 10. Since the drive controller 10 and remote I/O unit 40 are connected via separate serial bus cables to support two types of communication, the separate cable connection has obstructed the effort to miniaturize the NC device unit 1*a*. To solve the problem, in the present invention, the period in which no operation command is transmitted to the drive controller 10 from the NC device unit 1 is used to perform the transmission/reception for the remote I/O unit 40.

Figure 4A:
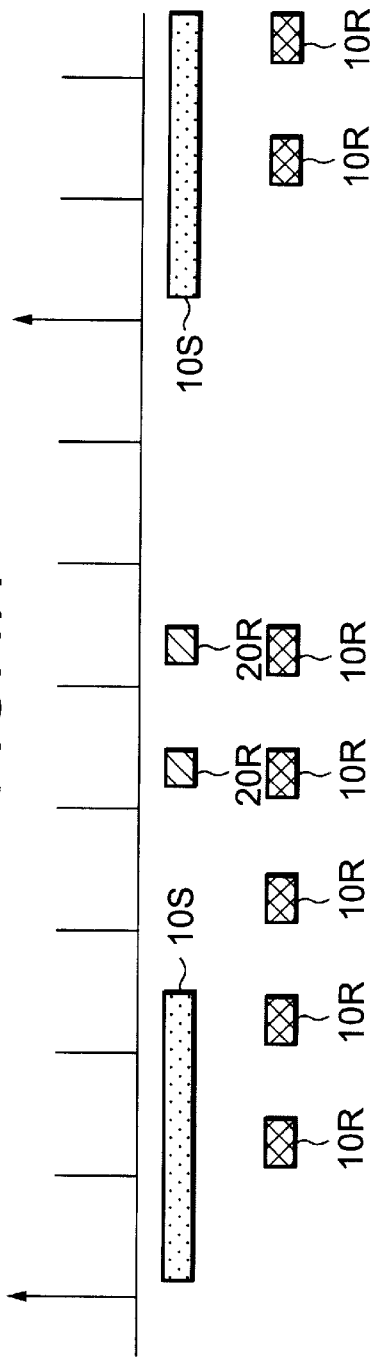
Figure 4B:
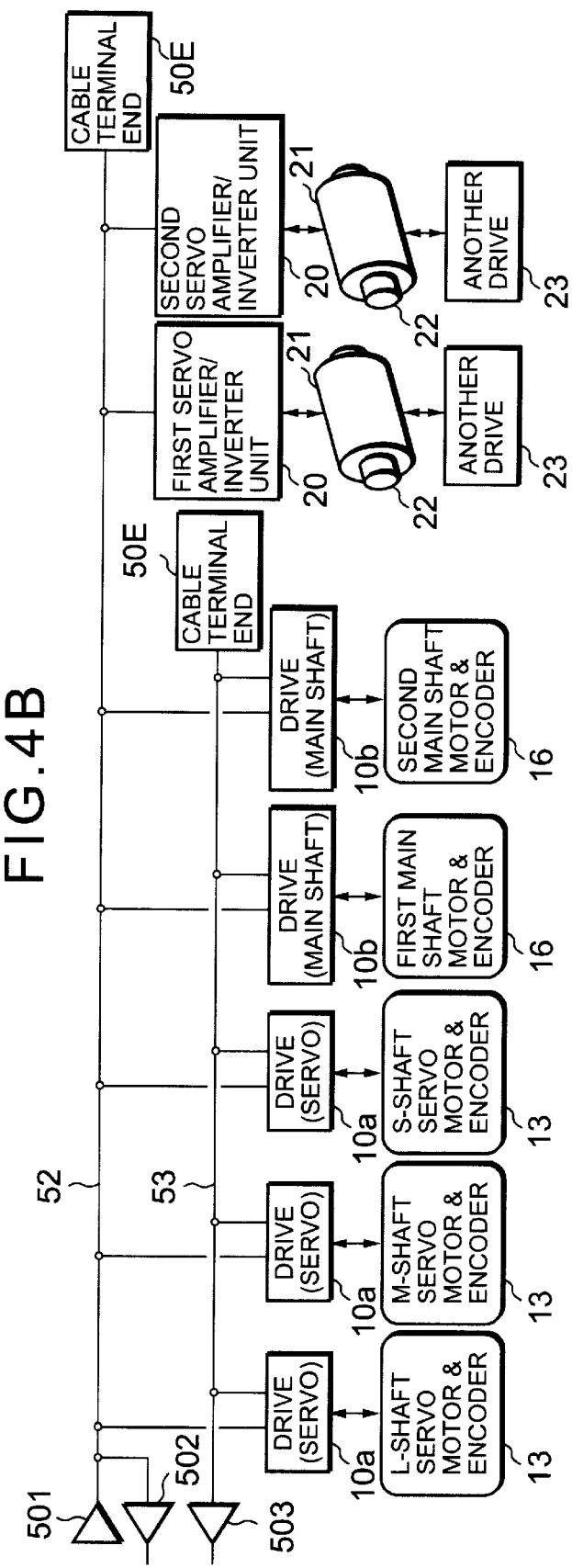

FIG. 4 is an explanatory view of the bus control system according to another embodiment of the present invention. It illustrates communication using the common serial bus between the NC device unit 1 and the drive controller 10 and the servo amplifier/inverter unit 20. FIG. 4(A) is a timing diagram showing a time division communication between the NC device unit 1 and the drive controller 10 and the servo amplifier/inverter unit 20. FIG. 4(B) is a detailed connection explanatory view of the NC device unit 1 and the drive controller 10 and the servo amplifier/inverter unit 20. In the drawing, the same reference numbers as those in FIG. 3 are used to denote the same or corresponding sections and the description thereof is omitted. In FIG. 4, numeral 20 denotes a servo amplifier/inverter unit, 21 denotes a motor for operating another drive 23, and 22 denotes a position detecting encoder of the motor 21.

The operation of the bus control system will next be described. The mode of data transmission/reception of the NC device unit 1, the servo motor drive controllers 10*a*, and the main shaft motor drive controllers 10*b* is the same as in the instance of FIG. 3. However, data 20R of the position detecting encoders 22, rather than the remote I/O units 40 in FIG. 3, is fed back to the NC device unit 1 via the serial bus 52 during the period in which no operation command is transmitted to the drive controller 10 from the NC device unit 1. In FIG. 4(A), the axis of abscissa is a time axis, a timing for sharing the serial bus 52 is shown, and 20R denotes feedback data of the position detecting encoder 22.

The conventional motor position detecting encoder 22 employs a system in which pulse trains are transmitted from the encoder. The number of pulses is counted by the NC device to detect the position of the drive object, but the recent position detecting encoder 22 is provided with a serial communication interface. This is because enhancement of resolution of the encoder raises a pulse rate, a high transmission band is necessary for the cable, and the transmission of a position detection pulse as it is results in a pulse miss causing a position deviation. As a countermeasure, the position detection data is transmitted to the NC device unit 1 via the serial bus. The merit of directly inputting the pulse is that the NC device unit 1 can recognize the latest position detection data at all times since there is no problem in actual control if the position detection data is updated as needed. Therefore, a serial transmission system is employed in the encoder. In the conventional bus control system, however, since the serial communication interface of the encoder is separate from the serial transmission line of the drive system, separate transmission lines are necessary. In the bus control system, as described later with reference to FIG. 10, a time for holding the feedback data of the motor position detecting encoder 22 and a time for transmitting the feedback data 20R to the NC device unit 1 from the encoder are determined based on the time when the master CPU module 101 of the NC device unit 1 serially transmits the movement command data to the drive controller 10. The hold time and the transmission time are determined in order to allow sharing of a communication line between NC device unit 1 and drive controller 10 with the servo amplifier/inverter unit. In this embodiment of the bus control system, since the network of the drive controller 10 and the network of the servo amplifier/inverter unit 20 can be shared, the number of communication connectors and cables can be reduced. The sharing network continues to allow each feedback data 20R of first and second servo amplifier/inverter units 20 synchronized with the drive controller 10 to be fetched.

Figure 5A:
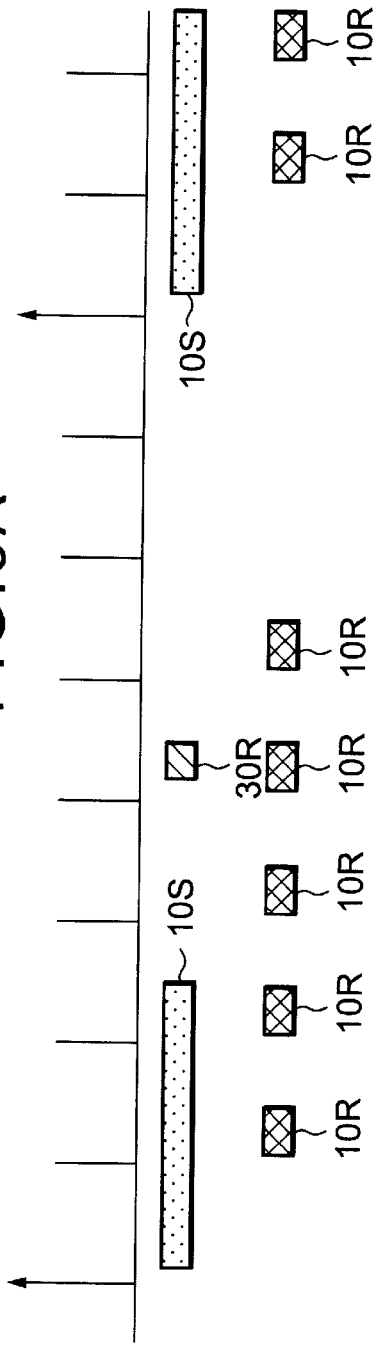
Figure 5B:
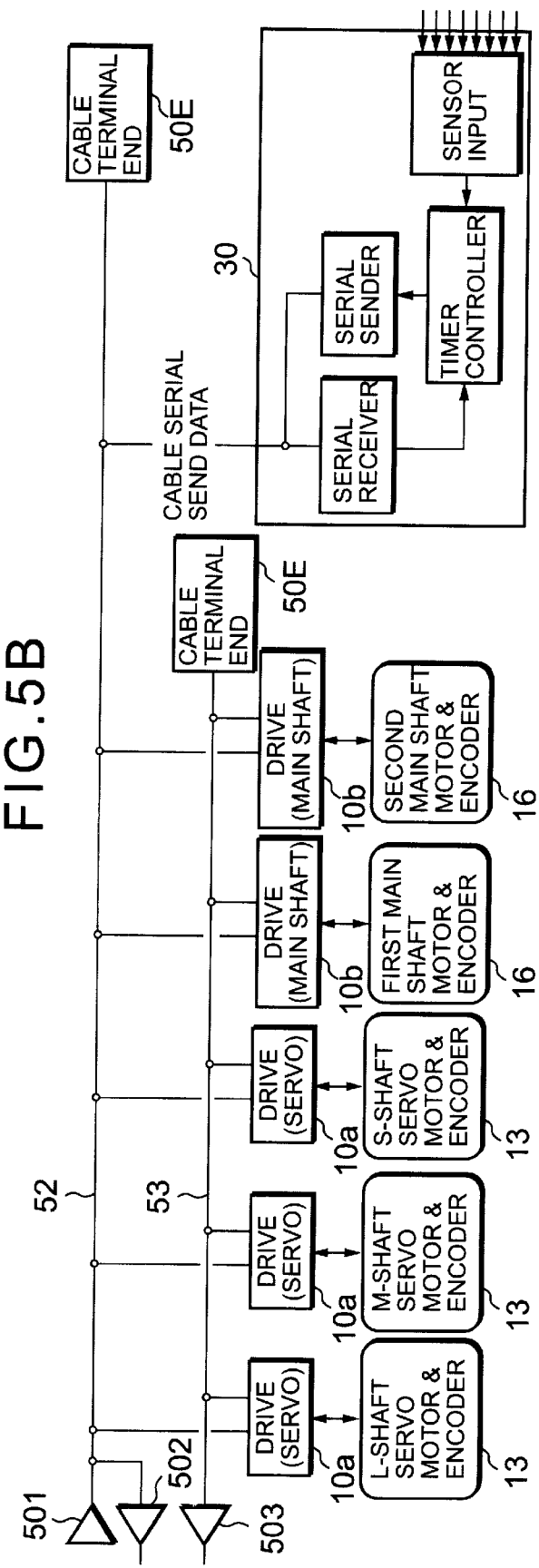

FIG. 5 is an explanatory view of the bus control system according of another embodiment of the present invention. It illustrates communication between the NC device unit 1, the drive controller 10, and the sensor input unit 30 using the common serial bus. FIG. 5(A) is a timing diagram showing communication timing sequences between the NC device unit 1 and the drive controller 10 and sensor input unit 30. FIG. 5(B) is a detailed connection diagram of the NC device unit 1, the drive controller 10, and the sensor input unit 30. In the drawing, the description of the codes denoting the same or corresponding sections as those of FIG. 3 is omitted. In FIG. 5, numeral 30 denotes a sensor input unit.

The operation of the bus control system is described next. The mode of data transmission/reception of the NC device unit 1, the servo motor drive controllers 10a, and main shaft motor drive controllers 10b is the same as in the instance of FIG. 3. However, data from the sensor input unit 30, rather than data from the remote I/O units 40 in FIG. 3, is fed back to the NC device unit 1. The data is fed back via the serial bus 52 during the period when no operation command is transmitted to the drive controller 10 from the NC device unit 1. In FIG. 5(A), the axis of abscissa is a time axis, a timing for sharing the serial bus 52 is shown, and 30R denotes feedback data to the NC device unit 1 from the sensor input unit 30.

The conventional NC machine is equipped with a counter that synchronizes with the processing timing of the NC machine in the NC machine. In the case where a sensor input operating is being performed, the value of this counter is held. A master CPU module 301 of the NC machine detects a time when the sensor is performing the input operation, whereby the master CPU module 301 conducts mechanical instrumentation and performs machining control that is different from the usual case. The mechanical instrumentation and machining control is performed based on the time when the sensor input operation is being performed. In this bus control system, as described below according to FIG. 9, a sensor input unit 30 recognizes the timing at which the sensor input signal is received during the period while the master CPU module 101 is repeatedly sending a unit move command to a drive control unit 10, by sending the input timing lag of the sensor input signal to an NC machine main body 1 as feedback data 30R based on the timing at which the master CPU module 101 serially sends move command data to the drive control unit 10. The receiving unit on the NC machine main body 1 side inputs the sensor input signal to the sensor input unit 30 according to the feedback data 30R including the input timing information of the sensor input signal sent from the sensor input unit 30. The receiving unit also generates an interrupt signal for the master CPU module 101 from an interrupt signal generation circuit 237 described later and starts interrupt processing.

Because such configuration of this bus control system enables transfer of the command data to the drive control unit 10 and of the feedback data 30R sent from the sensor input unit 30 to share the serial bus 52, the number communication connectors and cables used can be reduced. Furthermore, the sensor input unit 30 that synchronizes with the drive control unit 10 can be controlled.

FIG. 6 is an explanatory view of the bus control system according to another embodiment of the present invention. It illustrates communication using the common serial bus among the NC device unit 1, the drive controller 10, the servo amplifier/inverter unit 20, the sensor input unit 30, and the remote I/O units 40. FIG. 6(A) is a timing diagram showing a time division communication between the NC device unit 1 and the I/O units 10, 20, 30, 40. FIG. 6(B) is a detailed connection explanatory view of the NC device unit 1 and the I/O units 10, 20, 30, 40. In the drawing, the same numerals as those in FIG. 3 or 5 denote the same or corresponding sections, and the description thereof is omitted. The drive controller 10, servo amplifier/inverter unit 20, sensor input unit 30, and remote I/O units 40 are connected to the serial bus 52. These data are transmitted/received with the NC device unit 1 via the serial bus 52 using the period in which the servo, main shaft amplifier command data 10S is not transmitted to the drive controller 10 from the NC device unit 1. After the transmission frame including the servo main shaft amplifier command data 10S for operating the servo main shaft motor is transmitted to the drive controller 10 from the NC device unit 1 as shown in FIG. 6(A), the serial bus 52 as a transmission line to the drive controller 10 from the NC device unit 1 has a vacant time. Therefore, during the vacant time, the NC device unit 1 receives the feedback data 20R of the position detecting encoder 22 and the sensor input data 30R, transmits the output data 40S to the remote I/O units 40, and receives the input data 40R from the remote I/O units 40.

In this embodiment of the bus control system, since the network of the drive controller 10 and networks of other external I/O units can be shared, the number of communication connectors or cables can be reduced. Furthermore, the other external I/O units can be controlled in synchronization with the drive controller 10.

Interface with Each I/O Unit on the Side of the Bus Control Device

FIG. 7 is a block diagram showing an interface provided in the NC device unit 1 in the bus control system shown in FIGS. 3 to 6 for connecting each external I/O unit. In the drawing, the same numerals as those of FIG. 25 denote the same or corresponding sections, and the description thereof is omitted. In FIG. 7, numeral 101a denotes a master CPU module for controlling the communication of the bus control device, 130 denotes a drive controller interface on the side of the NC device unit 1 for performing communication with the NC device unit 1 and drive controller 10, 131 denotes a transmission memory for holding data to be transmitted to the drive controller 10, 132 denotes a receive memory for holding data received from the drive controller 10, 133 denotes a send controller for performing transmission to the drive controller 10, 134 denotes a receive controller for receiving data from the drive controller 10, 135 denotes a send timing control register for determining a transmission timing for the drive controller 10 and remote I/O unit 40 in time division, 136 denotes a receive status control register for holding a reception result status from the drive controller 10, 140 denotes a remote I/O interface on the side of the NC device unit 1 for performing communication with the NC device unit 1 and the remote I/O unit 40, 141 denotes a send register for holding data to be transmitted to the remote I/O unit 40, 142 denotes a receive register for holding data received from the remote I/O unit 40, 143 denotes a send controller for performing transmission to the remote I/O unit 40, 144 denotes a receive controller for receiving data from the remote I/O unit 40, 146 denotes a receive status control register for holding a reception result status from the remote I/O unit 40, 150 denotes a position detecting encoder interface on the side of the NC device unit 1 for receiving data of the position detecting encoder 20 from the servo amplifier/inverter unit 20, 151 denotes a position detecting encoder receiver for receiving a serial transmission frame including position information from the position detecting encoder 22, 152 denotes a receive register for holding data received by the position detecting encoder receiver 151, 160 denotes a sensor input interface for receiving sensor input information from the external sensor input unit 30, 165 denotes a sensor input data receiver for receiving serial data including the sensor input information transmitted from the external sensor input unit 30, 166 denotes a receiver register, and 167 denotes a sensor interrupt generating circuit for generating an interrupt for the master CPU module 101a upon receiving a reception frame indicating that there is a sensor input from the sensor input unit 30. Numeral 170 denotes a multiplexer for switching transmission signals from the transmission controller 133 and send controller 143, and 180 denotes an output gate control circuit for controlling gates of the send driver element 501 and receiver element 502 of the serial bus 52 to transmit/receive each data at the timing shown in FIG. 6(A). Numeral 101a denotes a master CPU module for controlling the interfaces 130, 140, 150, 160, and 70 denotes a parallel bus for connecting the interfaces 130, 140, 150, 160.

The operation of the drive control interface 130 and remote I/O interface 140 will next be described as an example. The send timing control register 135 transmits the output data 40S to the external remote I/O unit 40 via the serial bus 52 while the operation command data 10S is not being transmitted to the servo motor drive controller 10a or the main shaft motor drive controller 10b. The remote I/O unit 40, after receiving the output data 40S with its address attached thereto, transmits a return frame including the input data 40R. Moreover, the servo, main shaft amplifier feedback data 10R from the servo motor drive controller 10a and main shaft motor drive controller 10b are transmitted via the serial bus 53.

Hardware Constitution of Sender/Receiver of External I/O Units 20, 30

Figure 8A:
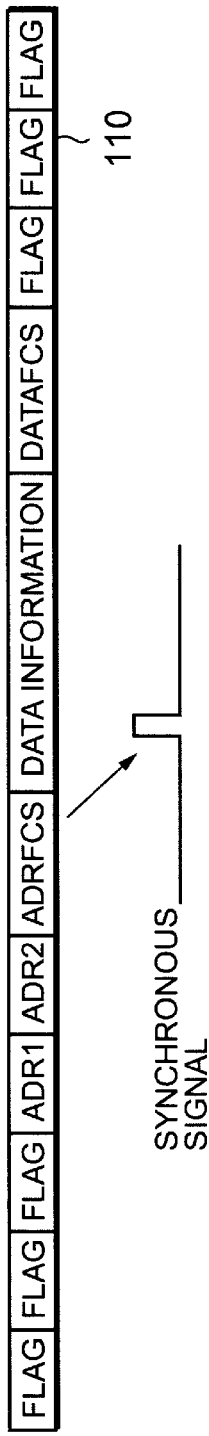
Figure 8B:
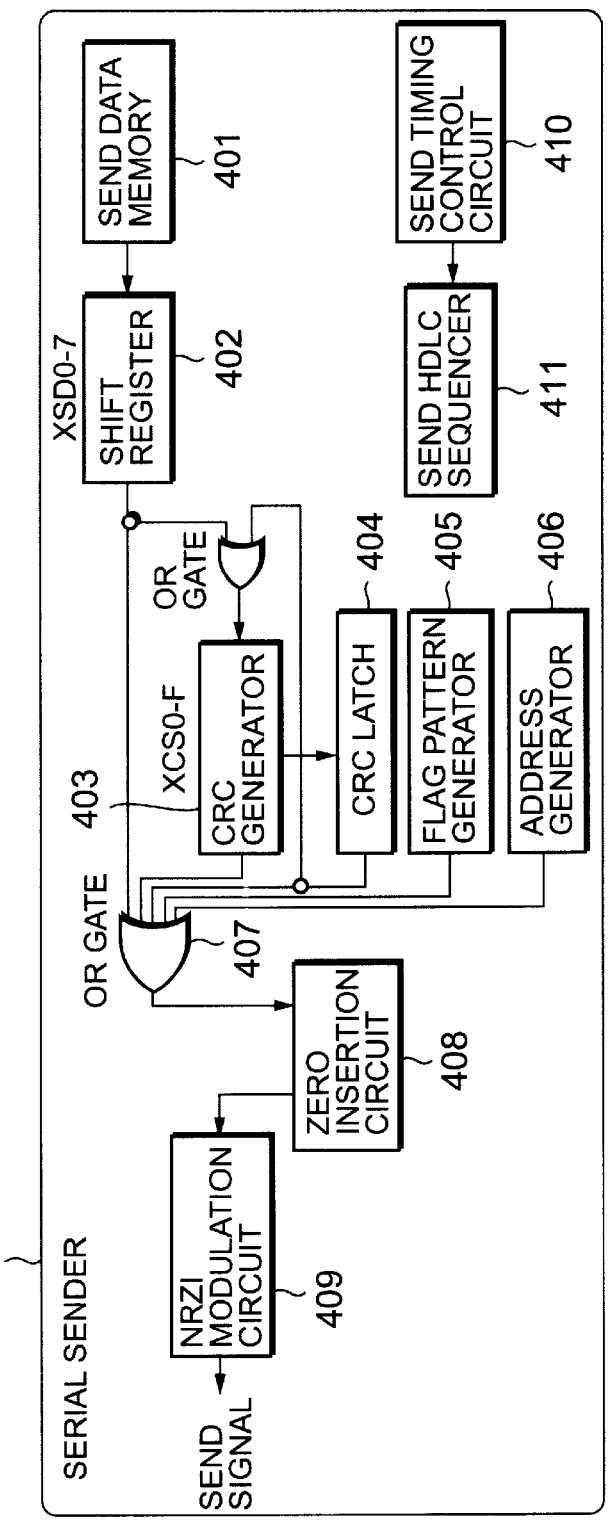
Figure 8C:
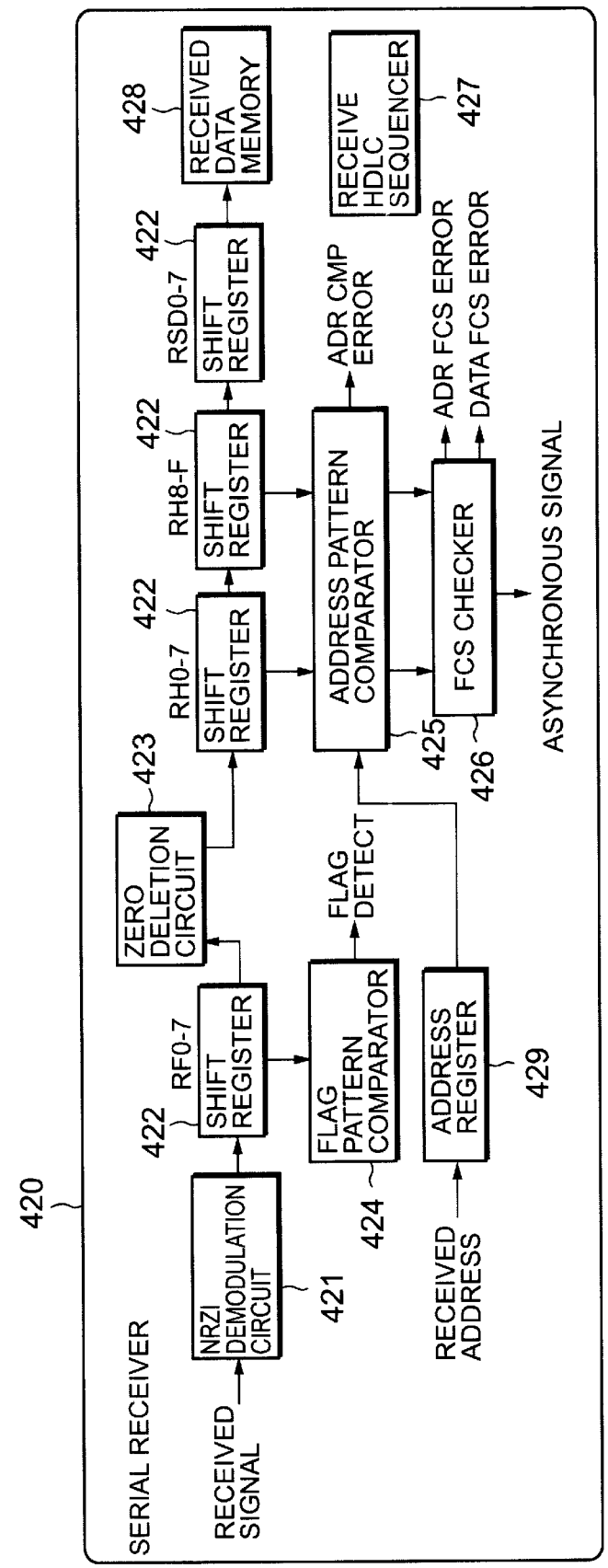

FIG. 8 is a schematic diagram of the transmission frame for use in the bus control system of the present invention. A serial sender and serial receiver provided in the servo amplifier/inverter unit 20 and sensor input unit 30 are connected to the serial bus. FIG. 8(A) shows the timing of the transmission frame sent by the master CPU module 101a and a synchronous signal outputted by the serial receiver of the servo amplifier/inverter unit 20 and sensor input unit 30. FIG. 8(B) shows a constitution of the serial sender. And FIG. 8(C) shows a constitution of the serial receiver. In FIG. 8, numeral 110 denotes a transmission frame transmitted by the NC device unit 1. After address (ADR2) of the frame is transmitted, ADRFCS is additionally transmitted so that a serial receiver 420 described later outputs the synchronous signal only when a check result of ADRFCS is normal to prevent an error output of the synchronous signal. Numeral 400 denotes a serial sender provided in the servo amplifier/inverter unit 20 and sensor input unit 30 as the external I/O units to perform transmission at a timing synchronous with the NC device unit 1. The serial sender 400 includes a send data memory 401 for storing transmission data to be transmitted to the NC device unit 1 by the servo amplifier/inverter unit 20 and sensor input unit 30; a shift register 402 for serially converting the data of the send data memory 401; a CRC generator 403 for additionally generating CRC data to detect an error of the transmission frame; a CRC latch 404 for holding the CRC data; a flag pattern generator 405 for additionally generating a flag pattern indicating a top and end of the transmission frame; an address generator 406 for generating a header pattern indicating a destination; an OR gate 407 for logically summing individual outputs of the shift register 402, CRC generator 403, CRC latch 404, flag pattern generator 405 and address generator 406; a zero insertion circuit 408 for inserting zero to transmission data to identify the communication data and flag pattern; an NRZI modulation circuit 409 for performing NRZI modulation on a transmission frame pattern; a send timing control circuit 410 for controlling the transmission timing of the transmission frame; and a send HDLC sequencer 411 for taking a timing to generate the transmission frame. Numeral 420 denotes a serial receiver provided in the servo amplifier/inverter unit 20 and sensor input unit 30 as the external I/O units for taking a synchronous timing with the NC device unit 1. The serial receiver 420 includes an NRZI demodulation circuit 421 for demodulating the send frame 110 subjected to NRZI modulation; a shift register 422 for shifting serial data of the send frame 110; a zero deletion circuit 423 for deleting zero from a received bit train with zero inserted thereto; a flag pattern comparator 424 for detecting the beginning and ending of the send frame 110; an address pattern comparator 425 for judging whether or not the header pattern of the send frame 110 transmitted to the drive controller 10 is normal to output an ADR CMP ERROR signal if it is not normal; an FCS checker 426 for checking whether or not ADRFCS and DATAFCS of the send frame 110 are normal to output SYNCHRONOUS SIGNAL when it is normal and to output an ADR FCS ERROR signal and DATA FCS ERROR signal if it is not normal; a receive HDLC sequencer 427 for performing a timing control of a reception processing; a received data memory 428 for storing received data; and an address register 429 for storing data to be compared with an office number address of a received signal.

Transmission to NC Device Unit from External I/O Units 20, 30

FIG. 9 is an explanatory view of transmission data to the NC device unit 1 from the sensor input unit 30 and a transmission timing of the data. FIG. 9(A) is an explanatory view of a constitution in which the sensor input unit 30 transmits a send frame 300; and FIG. 9(B) is an explanatory view of an operation for holding a sensor input timing. In FIG. 9, numeral 300 denotes a sensor serial send frame including the feedback data 30R transmitted by the sensor input unit 30; 301 denotes a sensor input section of the sensor input unit 30; 302 denotes a pulse generator for receiving a signal indicating that a sensor input has been received from the sensor input section 301 to generate a differential pulse; 303 denotes a clock generator; and 304 denotes a sensor input measuring counter for receiving a clock from the clock generator 303 to operate.

The transmission operation of the sensor input unit 30 is described next. As shown in FIG. 9(B), the sensor input unit 30 repeats operations by resetting when the sensor input measuring counter 304 counts clocks outputted by the clock generator 303 until the number of clocks reaches a predetermined value. However, the sensor input unit 30 resets the counter to start measuring the clocks on receiving SYNCHRONOUS SIGNAL from the serial receiver 420. Subsequently, when there is a sensor input from the sensor input section 301, in response to the differential pulse from the pulse generator 302, the measured/counted value of the sensor input measuring counter 304 at that time is latched in the sensor input timing holding register 305. The counted value constitutes a deviation amount of a timing at which the synchronous signal is received and a timing of the sensor input from the sensor input section 301. In this manner, the sensor serial send frame 300 including the deviation amount of the timing at which the sensor input is performed is transmitted to the NC device unit 1 on the basis of a timing at which the master CPU module 101a serially transmits movement command data to the drive controller 10.

In the embodiment, it is recognized at which timing the sensor input is entered during a period for the master CPU module 101a to repeatedly transmit unit movement commands to the drive controller 10, by transmitting the deviation amount of the timing at which the sensor input is performed to the NC device unit 1 on the basis of the timing at which the master CPU module 101a serially transmits the movement command data to the drive controller 10. When it is determined from the sensor serial send data 300 transmitted from the sensor input unit 30 that there is a sensor input, the sensor input data receiver 165 of the NC device unit 1 allows the sensor interrupt generating circuit 167 to generate an interrupt signal, and starts an interrupt processing for the master CPU module 101a. In this constitution, the master CPU module 101a can implement machine measurement, or perform a processing control different from an ordinary control based on sensor input timing information.

Figure 10A:
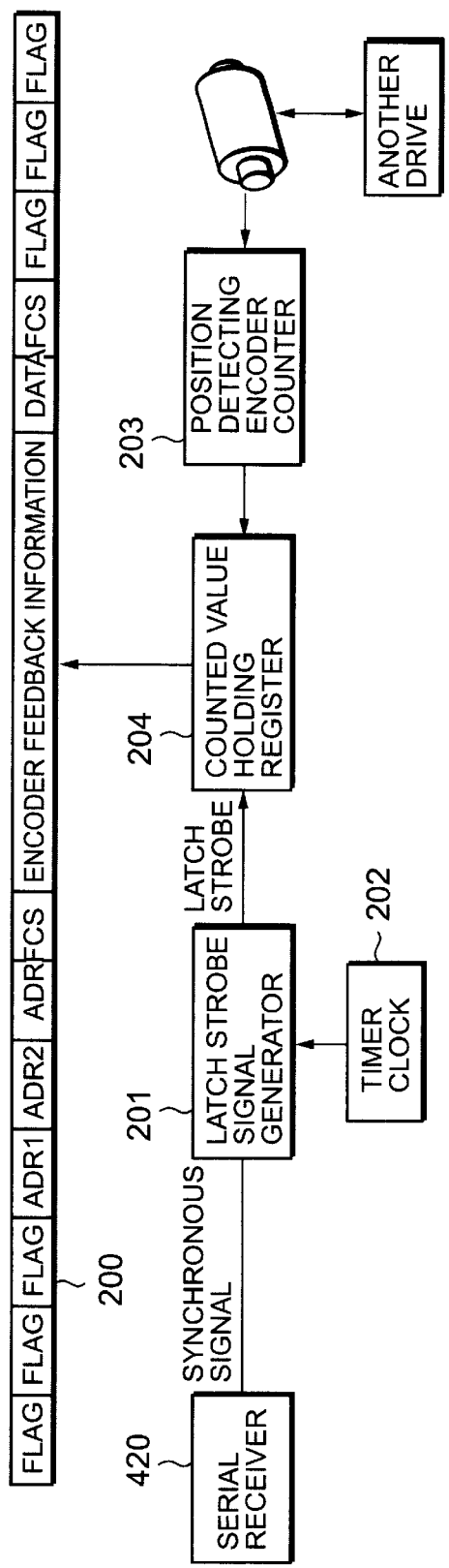
Figure 10B:
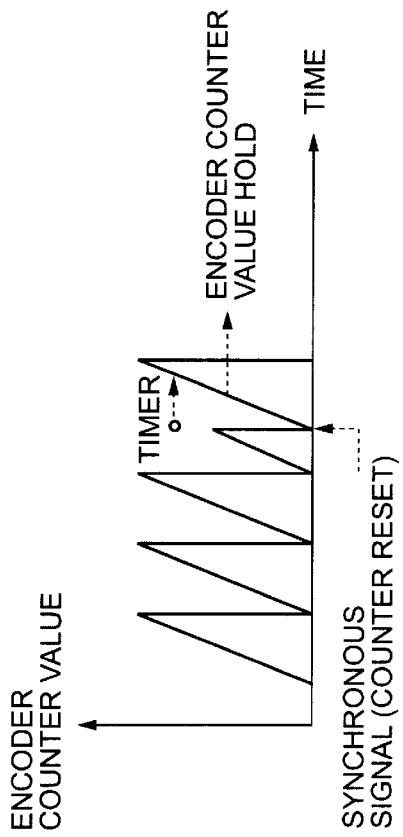

FIG. 10 is an explanatory view of a constitution/operation for transmitting transmission data to the NC device unit 1 from the servo amplifier/inverter unit 20. FIG. 10(A) is an explanatory view of a constitution in which the servo amplifier/inverter unit 20 transmits a send frame 200; and FIG. 10(B) is an explanatory view of an encoder feedback data holding operation. In FIG. 10, numeral 200 denotes a motor position detection data transmission frame including the feedback data 20R; 201 denotes a latch strobe signal generator which, upon receiving the synchronous signal from the serial receiver 420 shown in FIG. 8, inputs a signal of a timer clock 202 and delays by a predetermined time to generate a latch strobe signal; 203 denotes a position detecting encoder counter; and 204 denotes a counted value holding register for receiving the latch strobe signal, holding a counted value of the position detecting encoder counter 203 and transmitting the motor position detection data send frame 200 to the NC device unit 1.

The transmission operation of the servo amplifier/inverter unit 20 will next be described. The number of pulses of the position detecting encoder 22 is counted by the position detecting encoder counter 203 and outputted to the counted value holding register 204. The counted value holding register 204 repeats its operation by resetting the counted value when the counted value reaches a predetermined value. Subsequently, on receiving the synchronous signal from the serial receiver 420, the latch strobe signal generator 201 delays by a predetermined time based on the signal of the timer clock 202 to output the latch strobe signal to the counted value holding register 204. The counted value holding register 204 holds the counted value at the time of input of the latch strobe signal, and transmits the motor position detection data transmission frame 200 including the counted value to the NC device unit 1.

In this constitution, since the communication line between the NC device unit 1 and the drive controller 10 is shared, the timing for holding the position detection data and the timing for transmitting the position detection data to the NC device unit 1 from the servo amplifier/inverter unit 20 can be determined. The timings are determined on the basis of the timing of the master CPU module 101a's serial transmission of movement command data to the drive controller 10.

Here, when the NC device unit 1 transmits the transmission frame 110 to the drive controller 10, the servo amplifier/inverter unit 20 and sensor input unit 30 receive destination addresses (ADR1, ADR2) and address check code (ADRFCS) of the send frame 110. When it is detected that they can normally be received, the serial receiver 420 outputs the synchronous signal. Subsequently, in response to the synchronous signal, the pulse generator 302 and latch strobe signal generator 201 shown in FIGS. 9 and 10 hold the sensor input timing data and motor position detecting encoder counter data. The sensor input timing holding register 305 and counted value holding register 204 transmit holding results in the form of the sensor serial send frame 300 and motor position detection send frame 200 to the NC device unit 1. The NC device unit 1 recognizes the sensor input timing based on the timing for performing the transmission to the drive controller 10 beforehand, and inputs cyclically obtained counter data of the position detecting encoder 22.

In the above-mentioned constitution, the generation of the latch strobe signal is delayed by the timer, but may be directly latched in the counted value holding register 204 by the synchronous signal from the serial receiver 420.

Communication Speed Control with Internal and External Remote I/O Units

Figure 11:
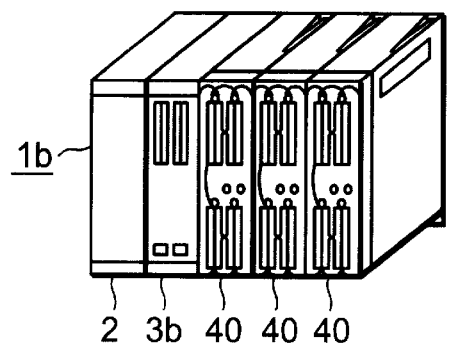
Figure 12:
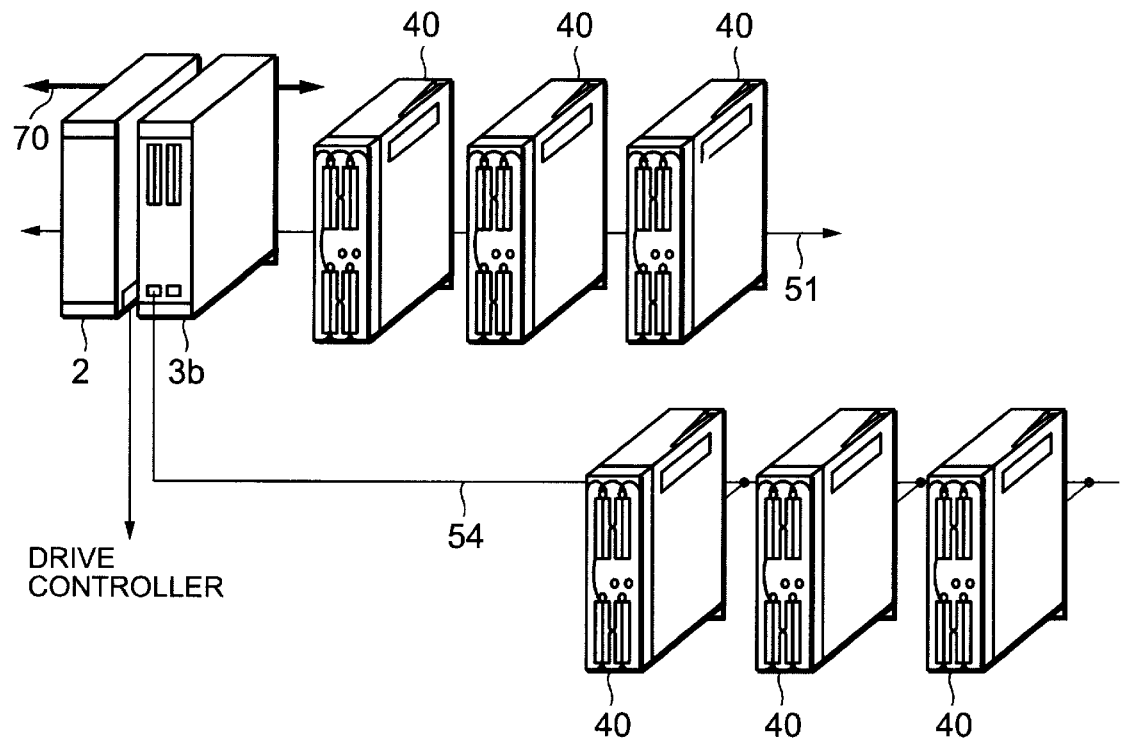
Figure 24A:
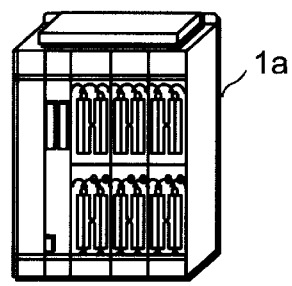
Figure 24B:
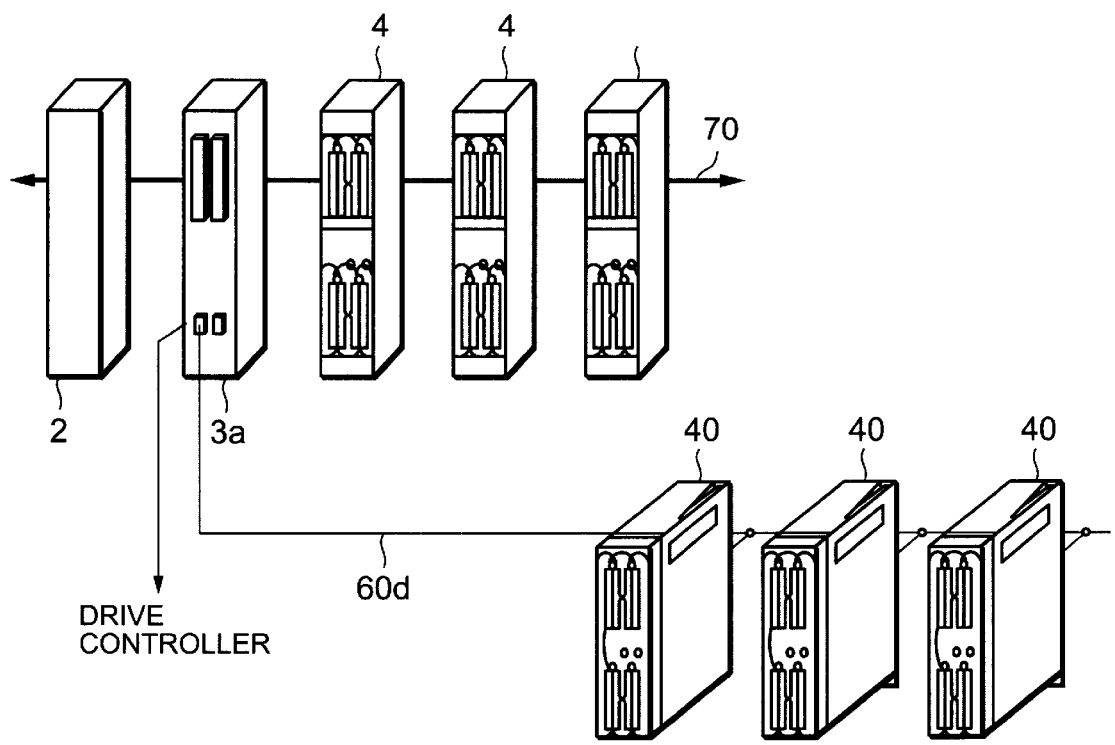

FIG. 11 is a schematic diagram of an NC device unit 1b provided with the bus control device of the present invention. FIG. 12 is a schematic diagram of the bus control system in which the remote I/O units 40 are connected to the NC device unit 1b. In FIGS. 11 and 12, numeral 1b denotes an NC device unit incorporating the remote I/O units 40 heretofore connected outside as internal units, 2 denotes an NC device control power source, and 3b denotes an NC control board. Numeral 51 denotes an internal serial bus of the bus control device, to which three remote I/O units 40 heretofore connected to the CPU module provided in the NC control board 3b from outside are connected, forming a short-distance high-speed send CYCLIC-NET. Numeral 54 denotes a send/receive serial bus REMOTE-NET for connecting the CPU module provided in the NC control board 3b and the remote I/O units 40 provided outside. It is capable of performing a low-speed but long-distance transmission. And numeral 70 denotes an FA SYSTEM BUS. For the NC device unit 1b, since the remote I/O units 4 as shown in FIG. 24(B) does not require control by the parallel bus FA SYSTEM BUS 70, the number of bus signal conductors is reduced and the degree of freedom of the system is increased. Additionally, by reducing the number of signal conductors necessary for the I/O control inside the NC device unit 1b, the NC device unit 1b can be miniaturized.

Figure 13:
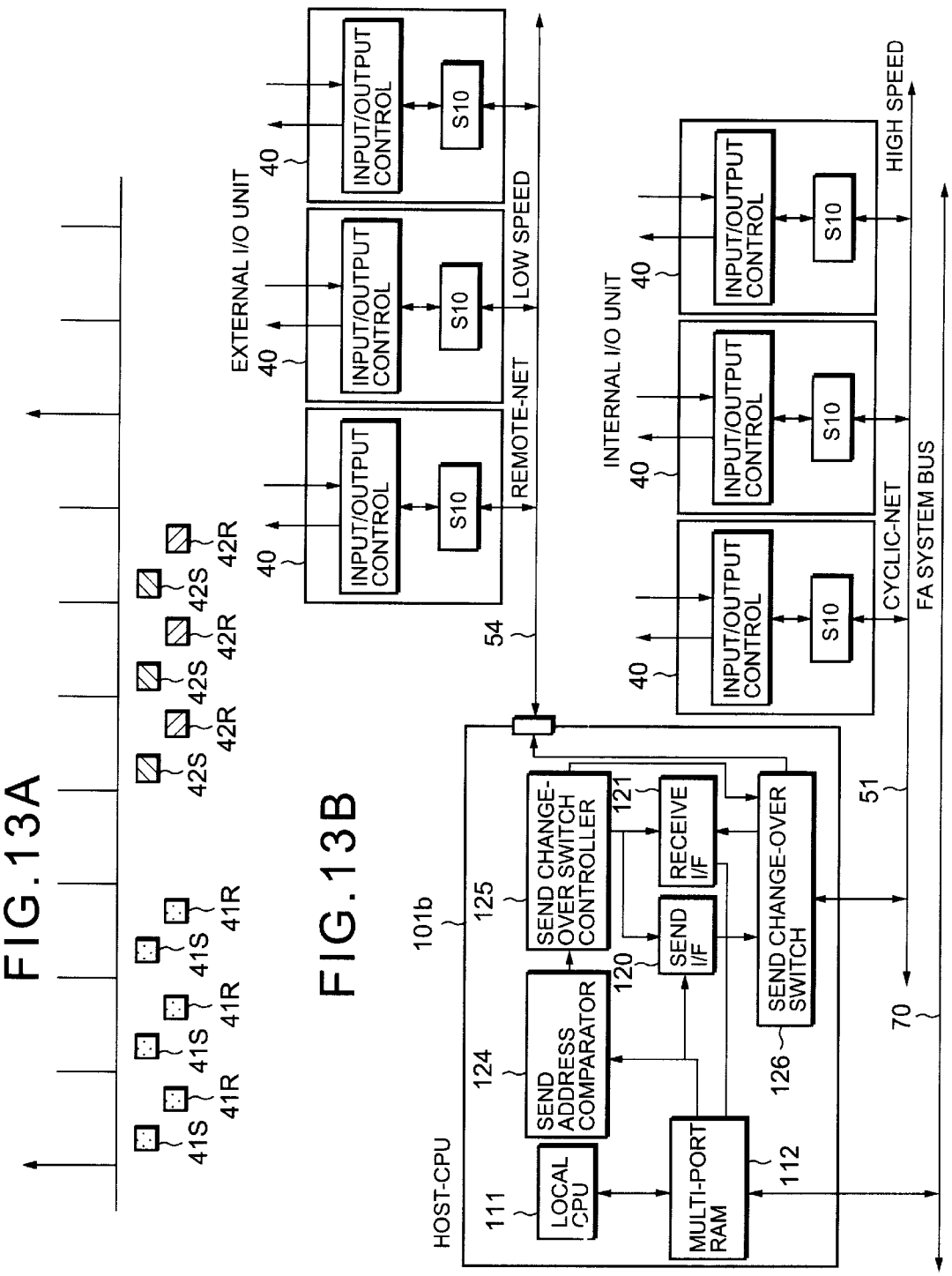
Figure 14:
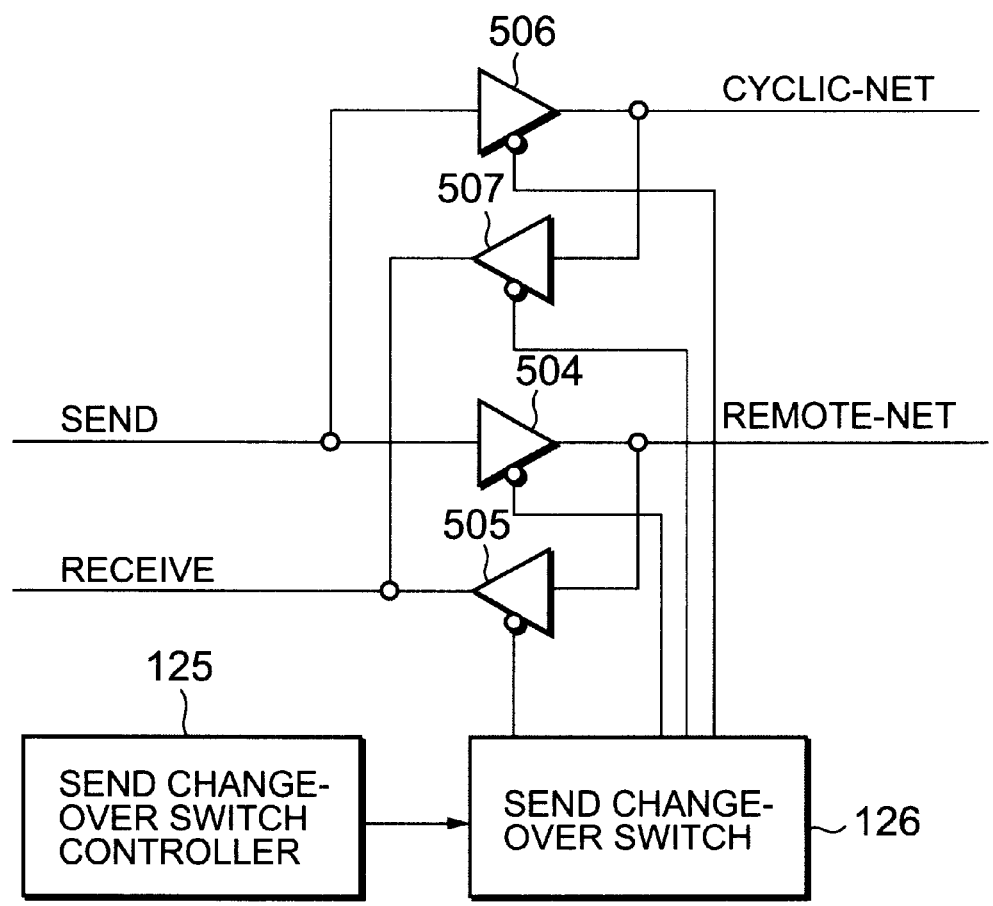

FIG. 13 is an explanatory view of a bus control system in which REMOTE-NET 54 and CYCLIC-NET 51 are switched for communication with the internal and external remote I/O units 40. FIG. 13(A) is a timing chart of the switching process; and FIG. 13(B) is a schematic diagram of the bus control system for performing the switching. In the drawings, the same reference numerals as those shown in FIG. 2 denote the same or corresponding sections and the description thereof is omitted. FIG. 14 is a connection diagram showing the periphery of a send change-over switch as an element of FIG. 13(B). In FIGS. 13 and 14, numeral 101b denotes a master CPU module for connecting the NC device unit 1b and each I/O unit connected to the NC device unit 1b, which is obtained by adding the following components to the master CPU module 101 shown in FIG. 2. Numeral 124 denotes a send address comparator for distinguishing a destination address read from the multi-port RAM 112 and added as header by the transmission interface at the time of transmission; 125 denotes a send change-over switch controller for outputting an identification signal to select either REMOTE-NET 54 or CYCLIC-NET 51 in response to an output signal of the send address comparator 124; 126 denotes a send change-over switch for responding to the identification signal of the send change-over switch controller 125 to switch and transmit the transmission data to either REMOTE-NET 54 or CYCLIC-NET 51; and 504 denotes a transmission driver element for receiving a signal from the send change-over switch 126 to transmit data from the send interface 120 toward REMOTE-NET 54 as the data 42S. Numeral 505 denotes a reception receiver element, which transmits data 42R from REMOTE-NET 54 to the receive interface 121. Moreover, numeral 504 denotes a send driver element, which receives a signal from the send change-over switch 126 to transmit the data from the send interface 120 toward CYCLIC-NET 51 as data 41S. Numeral 507 denotes a reception receiver element, which transmits data 41R from CYCLIC-NET 51 to the receive interface 121. Furthermore, the receive interface 121 waits for transmission from the internal and the external I/O units with a reception clock corresponding to a transmission rate transmitted from the send interface 120. In this embodiment, after the send address comparator 124 recognizes the destination address additionally read from the multi-port RAM 112, it outputs the identification signal to the send change-over switch controller 125. The send change-over switch controller 125 performs a high-speed transmission by CYCLIC-NET 51 for the internal I/O units, and a low-speed long-distance transmission by REMOTE-NET 54 for the external I/O units by the send change-over switch 126 in response to the identification signal.

There has been a strong request for installing the external I/O units connected to the bus control device which require serial data communication apart from the bus control device. To lengthen the distance, the communication rate needs to be lowered. Since a communication rate difference is generated from the serial communication type I/O interface for the internal I/O unit connected inside the bus control device, there is a problem that the communication rate for the internal I/O unit needs to be lowered. In the above-mentioned constitution, by analyzing the header information including the destination address, the destination is changed over when the transmission rate is changed over. For the I/O unit used in the conventional control device, the reception from the I/O unit is performed immediately after completing the transmission. Therefore, after the header information is analyzed to change over the transmission rate, the transmission from the I/O unit is waited for with the reception clock corresponding to the same transmission rate. That way, the transmission/reception with the I/O units corresponding to different transmission rates can be realized. Since the transmission rate in the NC device unit 1b can be set without considering the effect of the distance of the external I/O unit, the performance of the bus control device for the internal I/O unit can be enhanced without considering the effect of the distance of the external I/O unit.

Figure 16:
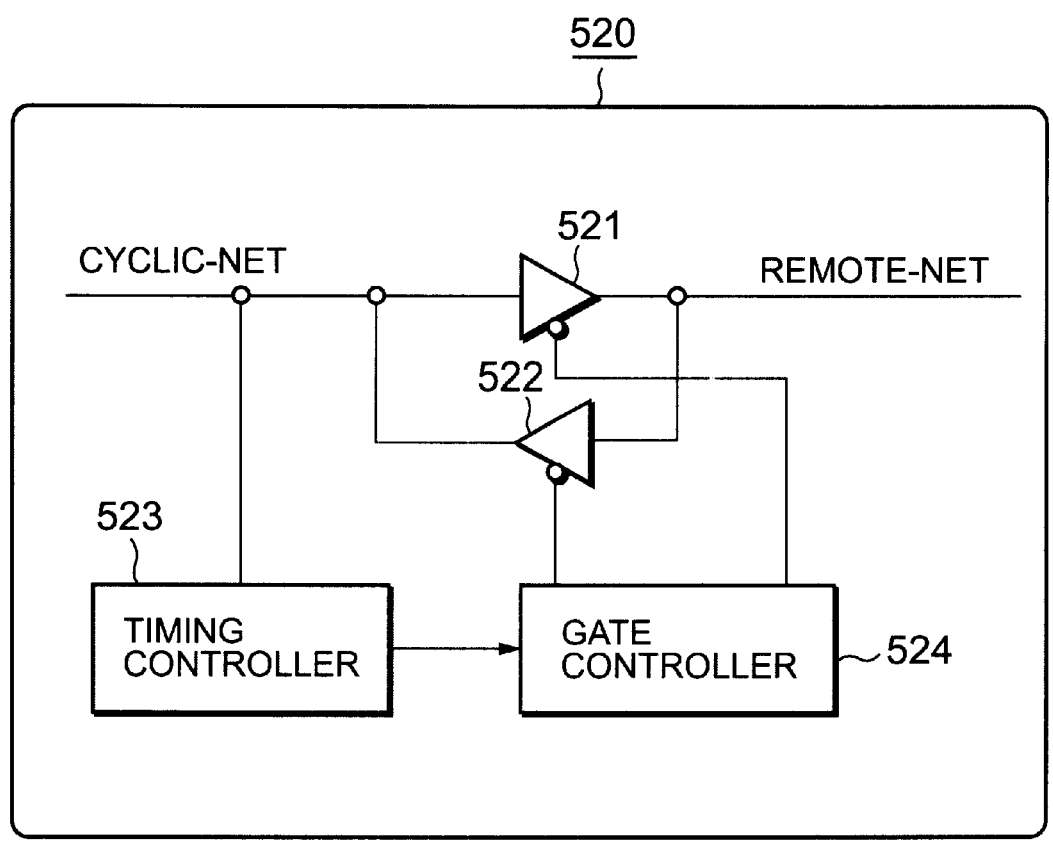

FIG. 15 is an explanatory view of a bus control system of another embodiment shown in FIG. 12 in which REMOTE-NET 54 and CYCLIC-NET 51 are switched for communication. FIG. 15(A) is a timing chart of the switching process. And FIG. 15(B) is a schematic diagram of the bus control system for performing the switching process. In the drawings, the same reference numerals as those in FIG. 13 denote the same or corresponding sections and the description thereof is omitted. FIG. 16 is a connection diagram showing the periphery of a repeater as a component in FIG. 15(B). In the drawings, numeral 101c denotes the same master CPU module as the master CPU module 101, the difference is the addition of the send address comparator 124 and serial bus send/receive speed controller 127. Moreover, three remote I/O units 40 are connected to CYCLIC-NET 51 as the internal units of the NC device unit. At the same time, the three units are connected to REMOTE-NET 54 as the external units. In the example, the same remote I/O unit 40 can be used as the internal unit and external unit of the NC device unit. A repeater 520 separates CYCLIC-NET 51 and REMOTE-NET 54. In the master CPU module 101c connected to the side of CYCLIC-NET 51, when the destination address is read from the multi-port RAM 112, the address of the internal and external unit is distinguished by the destination address comparator 124. The address information is transmitted to the serial bus send/receive speed controller 127, and the serial bus send/receive speed controller 127 controls the switching of the send/receive speed based on the information. In the repeater 520 in which the speed of the transmission frame is detected through CYCLIC-NET 51, for low-speed transmission, a gate of send driver element 521 is opened to transmit the transmission frame to REMOTE-NET 54. After the transmission, a timing controller 523 provided in the repeater 520 performs a control for opening a gate of reception receiver element 522 to transmit the return frame from the remote I/O unit 40 to CYCLIC-NET 51. The gate controls of the send driver element 521 and the receive driver element 522 are performed by a gate controller 524 based on a command received from the timing controller 523. After transmission to the remote I/O unit 40, the serial bus send/receive speed controller 127 of the master CPU module 101c waits for the transmission frame from the remote I/O unit 40 with the same reception clock as during the transmission to perform reception. Moreover, at a time for starting the transmission, the serial bus send/receive speed controller 127 reads the destination address from the multi-port RAM 112, the destination address comparator 124 distinguishes the destination, and the transmission speed is changed over in the above-mentioned procedure. In the bus control system shown in FIG. 15, when the destination address is read from the multi-port RAM 112, a distinction is made between the internal and the external I/O unit destination. In the example, when the master CPU module 101c can recognize the destination beforehand, the destination can be directly set by the serial bus send/receive speed controller 127 in a register or the like.

Communication Speed Control of Drive Controller and Another External I/O Unit

Figure 17A:
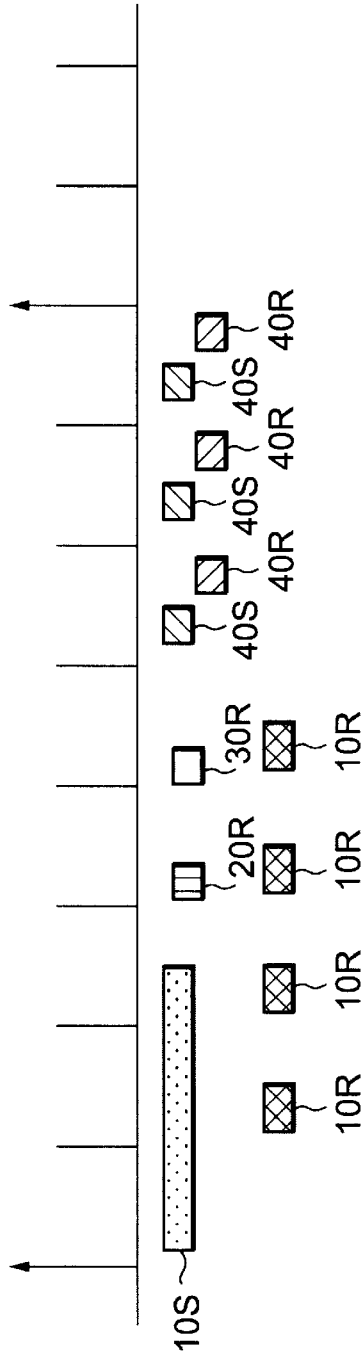
Figure 17B:
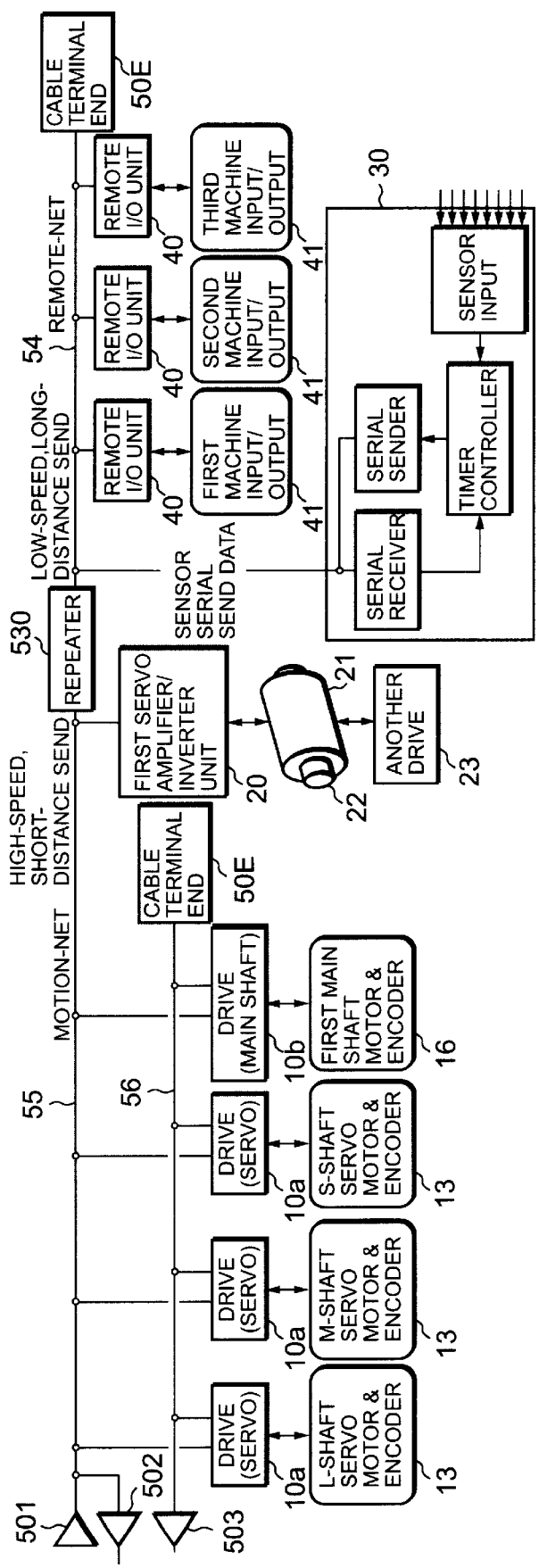

FIG. 17 is an explanatory view of a bus control system in which the drive controller 10 and the servo amplifier/inverter unit 20 are connected to the NC device unit via MOTION-NET 56 as a serial bus capable of performing high-speed, short-distance communication. The other remote I/O units 40 and sensor input unit 30 are connected to the NC device unit via REMOTE-NET 54 capable of performing a low-speed, long-distance communication. FIG. 17(A) is a timing diagram showing time division communication between the NC device unit and the external unit. FIG. 17(B) is a detailed connection diagram of the NC device unit and the external unit. In the drawings, the same reference numbers as those of FIG. 6 denote the same or corresponding sections and the description thereof is omitted. In FIG. 17, MOTION-NET 55 and 56 are networks for transmitting command data to the drive controller 10 from the NC device unit. The networks are also for transmitting the position information data to the NC device unit from the servo motor units 13 and the main shaft motor unit 16. The networks employ a double communication system. For the motor drive control, to realize a high-rate, high-precision machine control, a high-speed transmission line is necessary. On the other hand, the remote I/O unit 40 and sensor input unit 30 may be controlled at a relatively low speed. They are mounted apart from the NC device unit in many cases, and connected to the NC device unit via the repeater 530 by REMOTE-NET 54 capable of performing a low-speed, long-distance communication, so that the system can flexibly be constructed.

Figure 18:
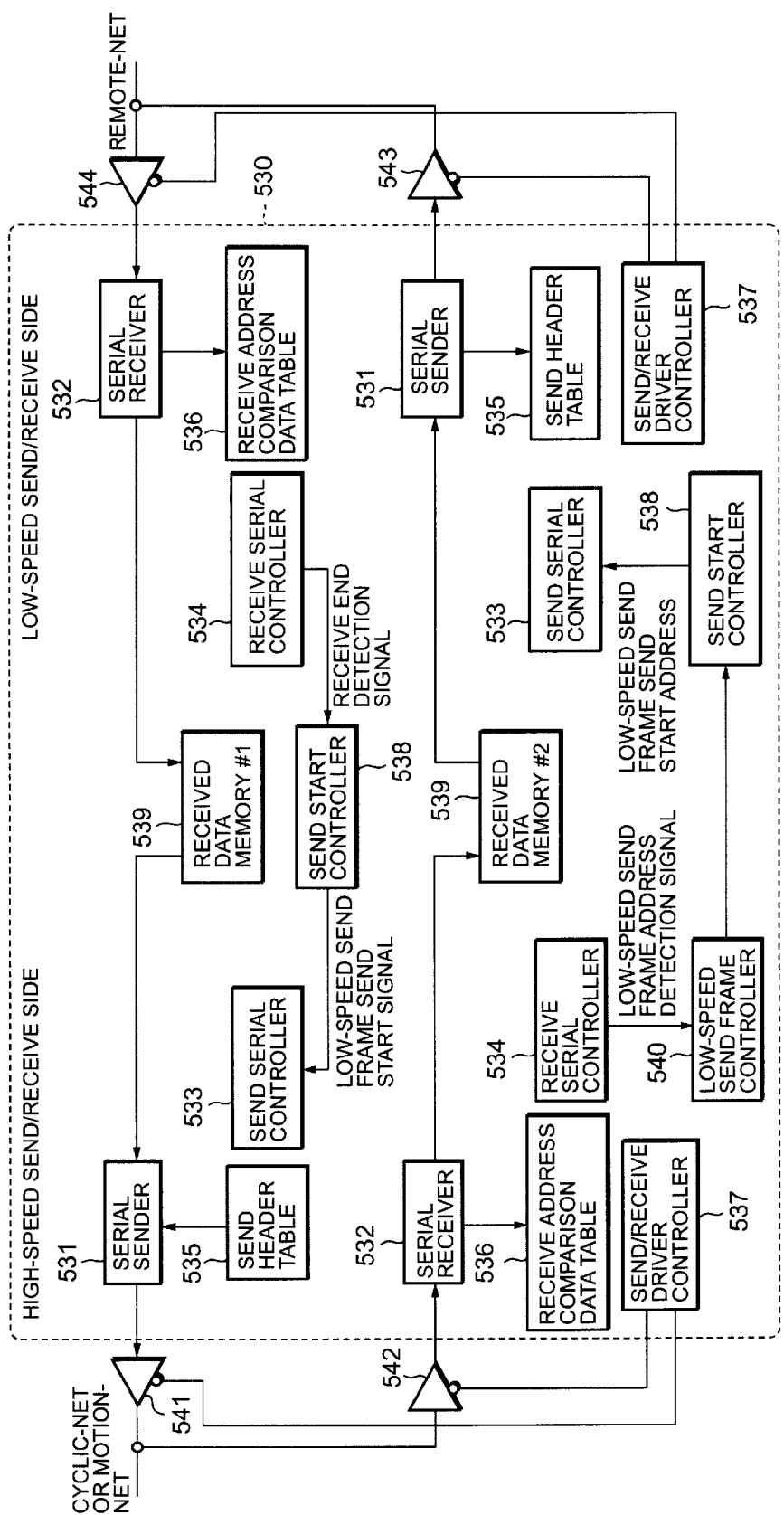

FIG. 18 is a schematic diagram showing an inner constitution of the repeater 530. In the drawing, 531 denotes a serial sender; 532 denotes a serial receiver, 533 denotes a send serial controller for controlling a serial send sequence; 534 denotes a receive serial controller for controlling a serial receive sequence; 535 denotes a send header table for holding header information to be added to the transmission frame; 536 denotes a receive address comparison data table for comparing the reception address of the reception frame; 537 denotes a send/receive driver controller for performing ON/OFF control of the reception receiver element 541 and send driver element 542 or the send driver element 543 and reception receiver element 544; and 538 denotes a send start controller for receiving a receive end detection signal from the receive serial controller 534 to start the send serial controller 533. Numeral 541 denotes a send driver element for connection to MOTION-NET 55; 542 denotes a reception receiver element for receiving signals from the MOTION-NET 55; 539 denotes a received data memory for temporarily accumulating the received data included in the received frame from the REMOTE-NET 54 or MOTION-NET 55; and 540 denotes a low-speed send frame controller for receiving signals from the receive serial controller to detect a low-speed transmission frame address and start transmission for the send start controller 538.

The operation of the repeater 530 will be described next. When the receive serial controller 534 detects from a frame address that a frame is to be transmitted to REMOTE-NET 54, the low-speed send frame controller 540 starts the send start controller 538. Additionally, the serial sender 531 assembles a transmission frame from the received data accumulated in the received data memory #2-539. The transmission frame is sent to REMOTE-NET 54 through the send driver element 543 at a low speed. After the remote I/O unit 40 connected to REMOTE-NET 54 receives the transmission frame, it transmits a response frame. The transmitted frame is accumulated to the received data memory #1-539 through the reception receiver element 544. The receive serial controller 534 transmits a receive end signal to the send start controller 538. The send start controller 538 again assembles the received data accumulated in the received data memory #1-539 into a transmission frame. The send serial controller 533 on the high-speed send/receive side is used to transmit the frame to MOTION-NET 55 at a high speed.

In the repeater 520 shown in FIG. 15, the serial bus send/receive controller 113 shown in FIG. 15(B) receives the result of the send address comparator 124 and uses that result to change over the transmission speed. Therefore, gate control of the send receiver 521 and the reception receiver 522 is based on the transmission speed on the side of repeater 520. In the repeater 530 shown in FIG. 18, however, since the received data memory 534 is provided, the repeater 538 can absorb the speed difference without changing the transmission speed in the serial bus send/receive speed controller 127. Therefore, the transmission speed does not need to be changed over on the side of master CPU module 10c.

Use of Two Types of Serial Buses in NC Device Unit

Figure 19:
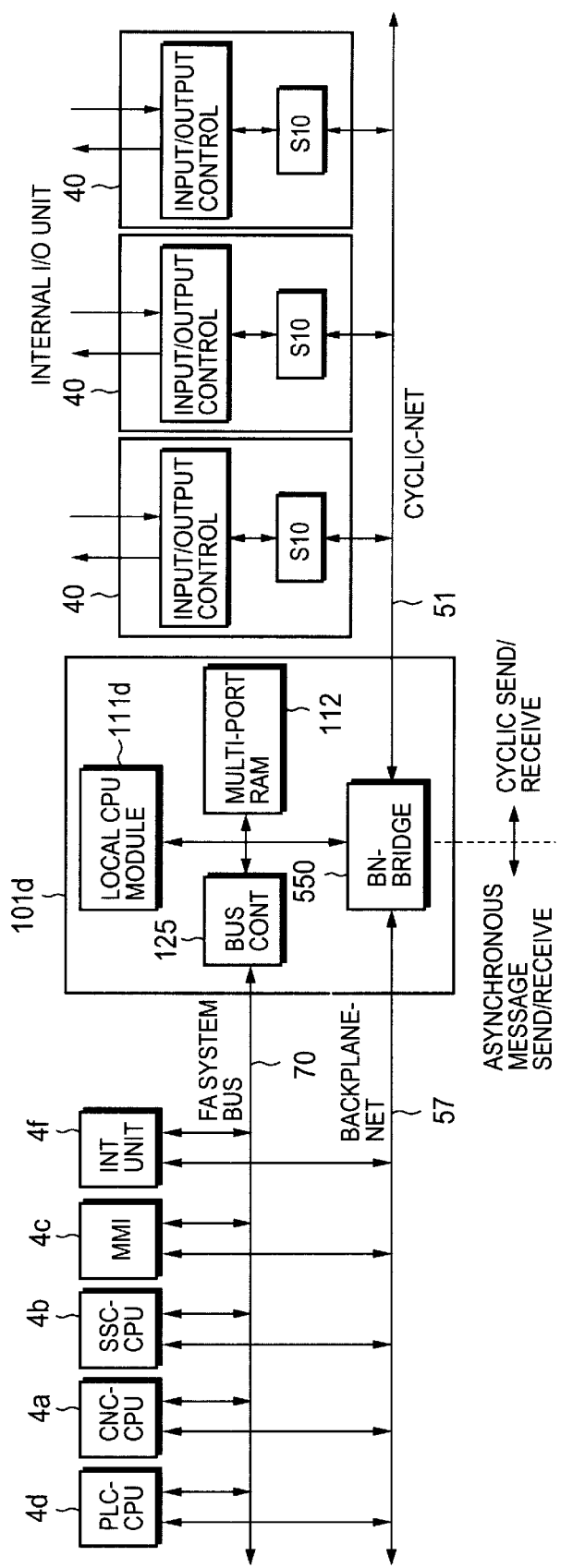
Figure 20:
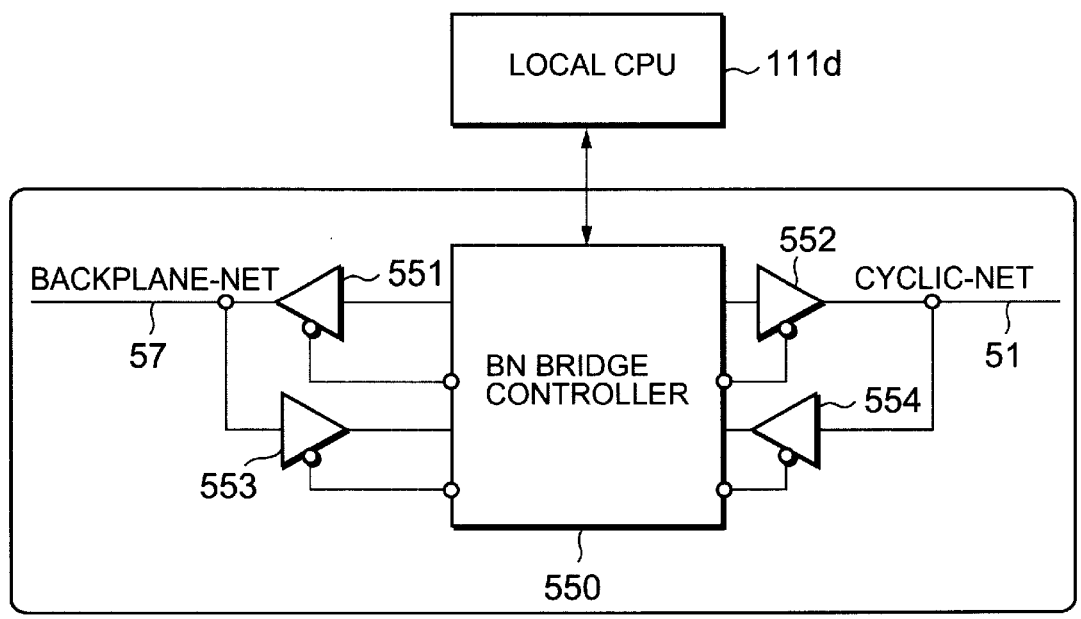

FIG. 19 is an explanatory view of the bus control device in which as the serial bus in the NC device unit there is provided a serial bus for transmitting/receiving a message generated asynchronously with a serial bus for performing a cyclic transmission/reception. In FIG. 19, numeral 57 denotes a serial bus for transmitting/receiving an asynchronous message or BACKPLANE-NET; 101d denotes a master CPU module for managing switching control of BACKPLANE-NET 57 and CYCLIC-NET 51; 111d denotes a local CPU module for controlling the switching of BACKPLANE-NET 57 and CYCLIC-NET 51; 125 denotes a parallel bus controller connected to the local CPU module 111d to control the FA SYSTEM BUS 70; and 550 denotes a bus net bridge (hereinafter referred to as BN-Bridge) for transferring a transmission/reception message between the BACKPLANE-NET 57 and the CYCLIC-NET 51. Here, as an example, three external remote I/O units 40 are connected to CYCLIC-NET 51 as the internal I/O units in the NC device unit. FIG. 20 is a schematic diagram showing an outline of BN-Bridge 550. In the drawing, numeral 551 denotes a send driver element for BACKPLANE-NET 57, 552 denotes a send driver element for CYCLIC-NET 51, 553 denotes a reception receiver element for BACKPLANE-NET 57, and 554 denotes a reception receiver element for CYCLIC-NET 51.

Figure 21:
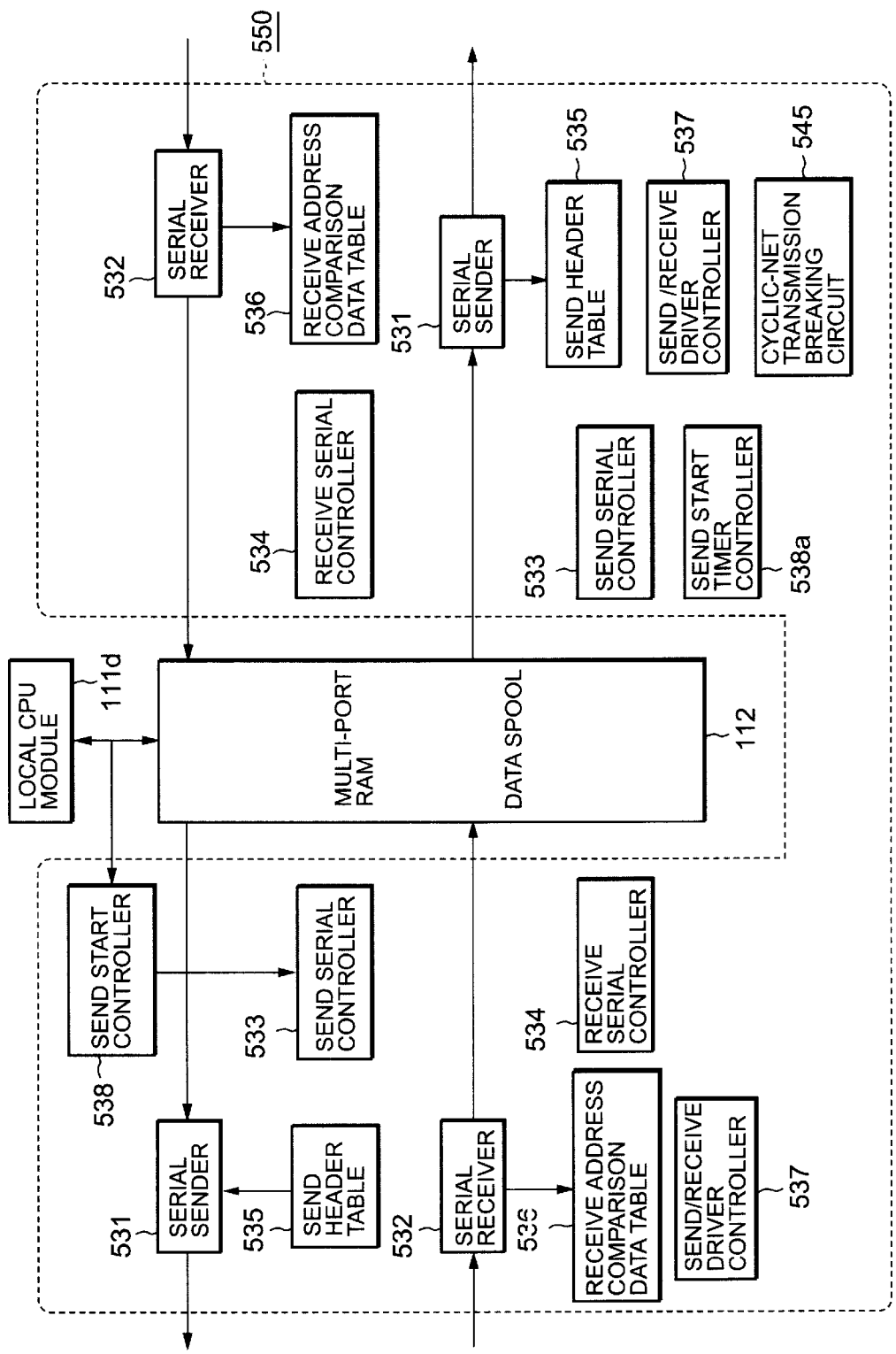

FIG. 21 is a schematic diagram of the bridge controller 550. In FIG. 21, the same codes as those of FIG. 18 denote the same or corresponding sections and the description thereof is omitted. Numeral 545 denotes a cyclic-net transmission breaking circuit for breaking the transmission of CYCLIC-NET 51 to turn off the output of the remote I/O unit 40 when the control device is abnormal; 537 denotes a send/receive driver controller for performing ON/OFF control of the send driver element 551 and reception receiver element 553 or the send driver element 552 and reception receiver element 554; 538a denotes a send start timer controller for starting a cyclic transmission; and 538 denotes a send start controller controlled by the local CPU module to start the send serial controller 533.

The operation of BN-Bridge 550 will next be described. After the system is started, BN-Bridge 550 performs transmission/reception to cyclically transfer input/output data between the remote I/O unit 40 and the multi-port RAM 112 by CYCLIC-NET 51. Additionally, it performs message transmission/reception between the multi-port RAM 112 and CNC-CPU 4a, SSC-CPU 4b, MMI 4c, PLC-CPU 4d, and INT-UNIT 4f in the NC device unit using BACKPLANE-NET 57.

For BN-Bridge 550, by interposing the multi-port RAM 112, communication protocol is converted, or the speed is converted to transfer the data between BACKPLANE-NET 57 and CYCLIC-NET 51. For CYCLIC-NET 51, based on a signal informing that abnormality is generated in the NC device unit, the transmission line is automatically set to a state where no serial communication can be realized. After the remote I/O unit 40 connected to CYCLIC-NET 51 detects that the serial communication is shut off, it outputs the signal OFF to the outside devices.

When the master CPU module 101d is structured as described above, the conventional FA SYSTEM BUS 70 wired for the remote I/O unit 40 requiring cyclic data exchange with the NC device unit becomes unnecessary. The wiring length of FA SYSTEM BUS 70 as the parallel bus can be shortened, and the BACKPLANE-NET 57 can be used for many purposes without being interrupted by the cyclic transmission/reception.

Broadcast Communication by BACKPLANE-NET

Figure 22:
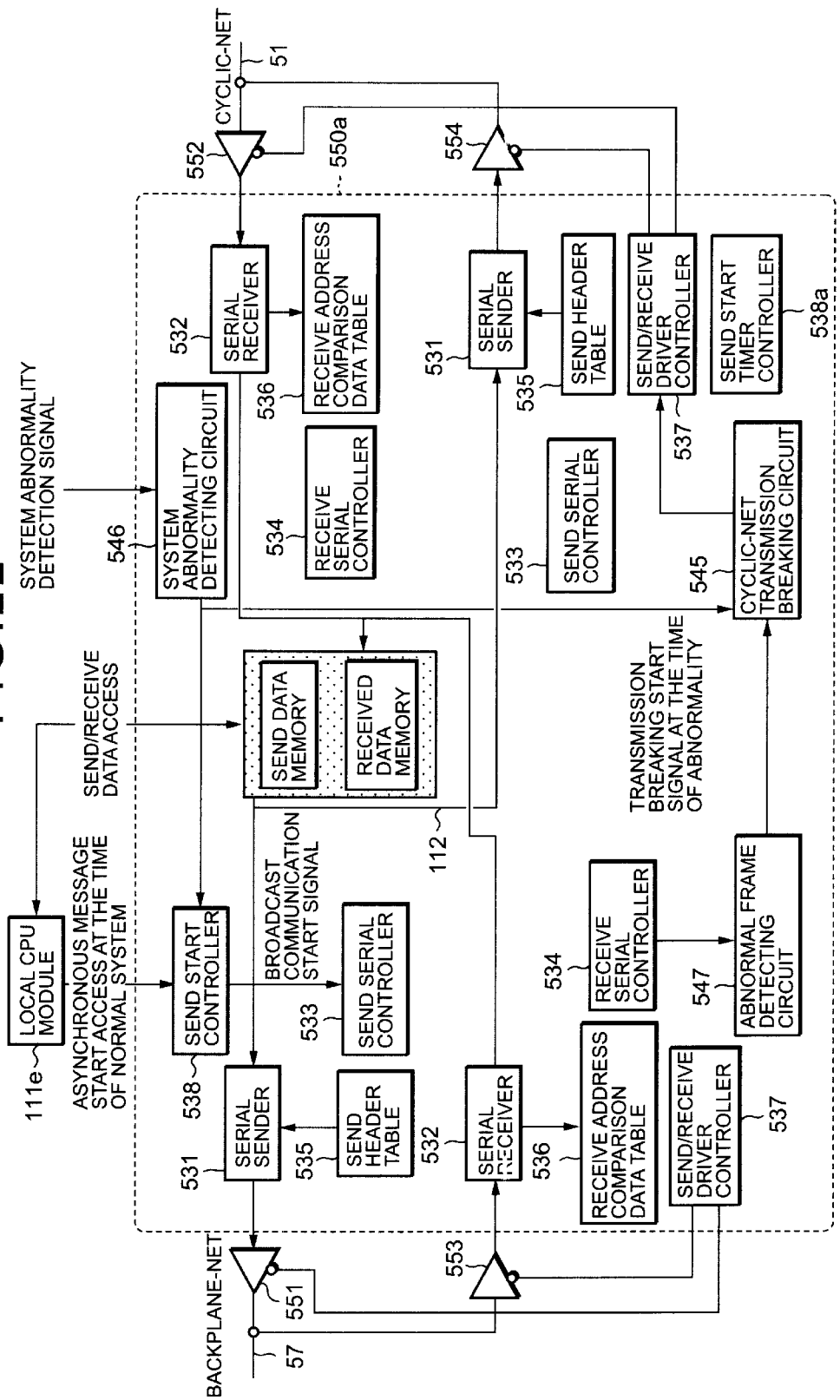

FIG. 22 is a schematic diagram showing BN-Bridge 550. The BN-Bridge 550 cuts off the transmission of CYCLIC- NET 51 and performs simultaneous broadcast communication to notify BACKPLANE-NET 57 of an abnormal state. In the drawing, the same codes as those of FIGS. 20 and 21 denote the same or corresponding sections and the description thereof is omitted. In FIG. 22, numeral 546 denotes a system abnormality detecting circuit for receiving a system abnormality detection signal from the outside to generate a simultaneous broadcast send start signal for BACKPLANE-NET 57 and a transmission breaking start signal for breaking the transmission to CYCLIC-NET 51; 547 denotes an abnormal frame detecting circuit for generating a signal to perform the transmission breaking for CYCLIC-NET 51 when receiving a frame transmitted from the unit connected to BACKPLANE-NET 57 and informing abnormality detection; and 550a denotes BN-Bridge 550 for performing the transmission breaking of CYCLIC-NET 51 and the simultaneous broadcast communication to notify BACKPLANE-NET 57 of an abnormal state.

The operation of the BN-Bridge 550a will be described next. Upon detecting a system abnormality detection signal, the system abnormality detecting circuit 546 starts the send start controller 538. When the send start controller 538 outputs a simultaneous communication start signal at the time of abnormality to the send serial controller 533, the serial sender 531 fetches a message informing an abnormal state from the multi-port RAM 112 and header information indicating a simultaneous broadcast communication from the send header table 535 to form a transmission frame and send it to BACKPLANE-NET 57. Moreover, upon detecting the system abnormality detection signal, the system abnormality detecting circuit 546 outputs a transmission breaking start signal at the time of abnormality to CYCLIC-NET transmission breaking circuit 545. The CYCLIC-NET transmission breaking circuit 545 controls the send/receive driver controller 537 to turn off gates of reception receiver element 552 and send driver element 554. Moreover, when the abnormal frame detecting circuit 547 detects a reception frame informing of the abnormality detected by another unit connected to BACKPLANE-NET 57, the transmission breaking start signal is outputted to the CYCLIC-NET transmission breaking circuit 545. Additionally, the CYCLIC-NET transmission breaking circuit 545 controls the send/receive driver controller 537 to turn off the gates of reception receiver element 552 and send driver element 554.

When the BN-Bridge 550a is constructed as described above, on receiving the system abnormality detection signal from the outside, the notification of the system abnormal state to BACKPLANE-NET 57 and the input/output of the remote I/O unit 40 connected to CYCLIC-NET 51 are turned off. Additionally, also by the abnormality detected by the other unit connected to BACKPLANE-NET 57, the input/output of the remote I/O unit 40 can be turned off, so that the safety of the system can be enhanced.

Possibility of Industrial Utilization

As described above, in the bus control device and bus control system according to the present invention, a serial bus is added in addition to the parallel bus for communication among the internal I/O units of the NC control device or the like. The addition of the serial bus reduces the data traffic of the parallel bus so that the performance of the NC control device is enhanced. Moreover, the invention is suitable for sharing the serial bus for the external unit connected to the NC control device and for realizing the flexible bus control system capable of performing the switching control of the transmission speed.

What is claimed is:

1. A bus control device comprising: a memory for storing addresses of a plurality of units connected to a serial bus and transmission/reception data transferred with the plurality of units; a transmission interface for transmitting a transmission frame formed by reading predetermined transmission data from said memory to said serial bus; a reception interface for monitoring said serial bus, receiving a reception frame including header information of the device, and writing data in said reception frame to a predetermined address of said memory; a serial bus transmission/reception controller for giving an address of a destination unit of said plurality of units and a timing for cyclic transmission to said transmission interface; and a local CPU for controlling the operation of said serial bus transmission/reception controller, performing transmission/reception by said serial bus with the unit connected to the serial bus out of said plurality of units, performing control to read said destination address and said transmission data from said memory during transmission, and writing said reception data to said memory during reception.

2. The bus control device according to claim 1 wherein a CPU is provided on each of said plurality of units, said local CPU and said CPU provided on the unit access said memory via said transmission interface and said reception interface to read or write said data.

3. The bus control device according to claim 1 wherein said transmission interface and reception interface are connected to a first serial bus for performing a cyclic message transmission and a second serial bus for transmitting an asynchronous message, said transmission interface and said reception interface connected to said first serial bus executing cyclic transmission/reception, said transmission interface and said reception interface connected to said second serial bus transmitting/receiving said asynchronous message.

4. The bus control device according to claim 3 wherein said transmission interface connected to said second serial bus transmits said transmission frame with said header information designating individual units connected to said second serial bus added thereto, and performs broadcast communication using said header information to simultaneously notify the units connected to said second serial bus of said transmission frame.

5. The bus control device according to claim 4 wherein when said transmission frame with said header information for performing the broadcast communication added thereto is transmitted to said second serial bus, the communication by said first serial bus is cut off.

6. A bus control system comprising: a unit connected to a high-speed serial bus for performing high-speed transmissions; a unit connected to a low-speed serial bus for performing low-speed transmissions; a memory for storing addresses of said units and predetermined transmission data to be transmitted to said units; a transmission interface for transmitting a transmission frame formed by reading said predetermined transmission data from said memory; a transmission address comparator for comparing the addresses of said destination units to output a signal indicating whether said frame is to be transmitted using said high-speed serial bus or said low-speed serial bus; and a transmission changeover switch for responding to said signal and selecting either said high-speed serial bus or said low-speed serial bus to output said transmission frame.

7. A bus control system comprising: a unit connected to a high-speed serial bus for performing high-speed transmissions; a unit connected to a low-speed serial bus for performing low-speed transmissions; a memory for storing addresses of said units and predetermined transmission data to be transmitted to a plurality of destination units; a serial bus transmission controller for performing a speed switching between a high-speed transmission and a low-speed transmission in accordance with the addresses said destination units; a transmission interface for transmitting a transmission frame formed by reading said predetermined transmission data from said memory to said high-speed serial bus at a transmission speed set by said speed switching; and a low-speed serial bus controller provided between said high-speed serial bus and said low-speed serial bus for transmitting said transmission frame to said low-speed serial bus when the transmission speed of said transmission frame transmitted from said high-speed serial bus is low.

8. The bus control system according to claim 7 wherein said unit connected to the high-speed serial bus is a drive controller for controlling a motor, and said unit connected to the low-speed serial bus is a remote I/O unit.

9. The bus control system according to claim 8 wherein the transmission interface performs a time division transmission for said drive controller and said remote I/O unit.

10. A bus control system wherein two units are connected to a serial bus comprising: a serial bus control device for controlling said serial bus, said serial bus control device comprises a memory for storing addresses of the units and predetermined transmission data to be transmitted to the units, a transmission interface for transmitting a transmission frame formed by reading said predetermined transmission data from said memory to said serial bus, and controlling a timing for transmission to one of said two units in a time zone in which transmission is not performed to the other one of said two units via said serial bus, and a reception interface for monitoring said serial bus and receiving a reception frame including header information of the device to write data to a predetermined address of said memory.

11. The bus control system according to claim 10 wherein one of said two units is a drive controller for controlling a motor, and the other one of said two units is a remote I/O unit.

12. The bus control system according to claim 10 wherein one of said two units is a drive controller for controlling a motor and the other one of said two units is a servo amplifier/inverter unit for transmitting position information of another motor outputted by a motor position detecting encoder to the reception interface.

13. The bus control system according to claim 12 wherein said servo amplifier/inverter unit comprises a serial receiver for outputting a synchronous signal when said transmission frame transmitted to said drive controller by said bus control device is normal, and said position information of another motor is transmitted to the reception interface a predetermined time behind the output of said synchronous signal.

14. The bus control system according to claim 10 wherein one of said two units is a drive controller for controlling a motor, and the other one of said units is a sensor input unit for transmitting an input signal from a sensor to said reception interface.

15. The bus control system according to claim 14 wherein said sensor input unit comprises a serial receiver for outputting a synchronous signal when said transmission frame transmitted to said drive controller by said bus control device is normal, and a time deviation amount indicating when said synchronous signal output and said sensor input are to be performed, said time deviation amount is transmitted to the reception interface.

* * * * *